United States Patent
Wang

(10) Patent No.: US 12,319,229 B2
(45) Date of Patent: Jun. 3, 2025

(54) METHOD FOR AUTHENTICATING IDENTITY OF DIGITAL KEY, TERMINAL DEVICE, AND MEDIUM

(71) Applicant: Huawei Technologies Co., Ltd., Shenzhen (CN)

(72) Inventor: Sishan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 664 days.

(21) Appl. No.: 17/605,110

(22) PCT Filed: Apr. 17, 2020

(86) PCT No.: PCT/CN2020/085225
§ 371 (c)(1),
(2) Date: Oct. 20, 2021

(87) PCT Pub. No.: WO2020/216131
PCT Pub. Date: Oct. 29, 2020

(65) Prior Publication Data
US 2022/0203933 A1    Jun. 30, 2022

(30) Foreign Application Priority Data

Apr. 22, 2019    (CN) .................. 201910324313.5

(51) Int. Cl.
*B60R 25/24*    (2013.01)
*G07C 9/00*    (2020.01)
(Continued)

(52) U.S. Cl.
CPC .......... *B60R 25/24* (2013.01); *G07C 9/00309* (2013.01); *G07C 9/23* (2020.01);
(Continued)

(58) Field of Classification Search
None
See application file for complete search history.

(56) References Cited

U.S. PATENT DOCUMENTS

| | | | |
|---|---|---|---|
| 7,340,048 B2 * | 3/2008 | Stern | ....................... H04L 67/04 379/218.01 |
| 8,768,565 B2 * | 7/2014 | Jefferies | ............. G07C 9/00571 701/32.7 |

(Continued)

FOREIGN PATENT DOCUMENTS

| | | |
|---|---|---|
| CN | 1684411 A | 10/2005 |
| CN | 101593383 A | 12/2009 |

(Continued)

*Primary Examiner* — Carlos Garcia
(74) *Attorney, Agent, or Firm* — Conley Rose, P.C.

(57) ABSTRACT

A method for authenticating an identity of a digital key, a terminal, and a medium, where before a second terminal enters a preset operating state from a non-preset operating state, identity authentication is first performed on a user using an identity authentication system of the second terminal, and obtained identity authentication information is stored in a secure element of the second terminal. Then, when a digital key in the second terminal is to be used, the identity authentication information stored in the secure element of the second terminal is sent to a first terminal, and the first terminal may perform verification based on the identity authentication information to determine whether the user using the digital key in the second terminal is an authorized holder of the second terminal.

20 Claims, 7 Drawing Sheets

(51) Int. Cl.
*G07C 9/23* (2020.01)
*H04L 9/08* (2006.01)
*H04L 9/32* (2006.01)
*H04L 67/04* (2022.01)

(52) U.S. Cl.
CPC .......... *H04L 9/0838* (2013.01); *H04L 9/3297* (2013.01); *H04L 67/04* (2013.01); *G07C 2009/00412* (2013.01); *G07C 2009/00507* (2013.01)

(56) References Cited

U.S. PATENT DOCUMENTS

| | | | |
|---|---|---|---|
| 9,405,897 B1 | 8/2016 | Bailey et al. | |
| 10,112,581 B2* | 10/2018 | Fernando | B60R 25/24 |
| 10,493,953 B2* | 12/2019 | Arakawa | G07C 9/215 |
| 10,668,896 B2* | 6/2020 | Arakawa | G07C 9/00571 |
| 11,142,166 B2* | 10/2021 | Arakawa | G06Q 50/10 |
| 11,228,913 B2* | 1/2022 | Jimenez | H04L 63/0853 |
| 2004/0132433 A1* | 7/2004 | Stern | H04M 3/4931 |
| | | | 455/410 |
| 2004/0164848 A1* | 8/2004 | Hwang | H04L 63/0861 |
| | | | 340/5.82 |
| 2006/0082437 A1* | 4/2006 | Yuhara | B60R 25/255 |
| | | | 340/5.82 |
| 2011/0291798 A1* | 12/2011 | Schibuk | H04L 63/0823 |
| | | | 235/382 |
| 2013/0317693 A1* | 11/2013 | Jefferies | G07B 15/00 |
| | | | 701/31.5 |
| 2014/0176301 A1* | 6/2014 | Fernandez Banares | G07C 9/21 |
| | | | 340/5.61 |
| 2015/0327004 A1 | 11/2015 | Jin et al. | |
| 2016/0117493 A1 | 4/2016 | Lu et al. | |
| 2016/0304087 A1 | 10/2016 | Noh | |
| 2017/0232931 A1* | 8/2017 | Fernando | B60R 25/241 |
| | | | 701/2 |
| 2017/0272434 A1 | 9/2017 | Fujisawa | |
| 2019/0001926 A1* | 1/2019 | Arakawa | B60R 25/241 |
| 2019/0056957 A1 | 2/2019 | Mewar et al. | |
| 2019/0294828 A1 | 9/2019 | Yoshizawa | |
| 2019/0371176 A1* | 12/2019 | Montemurro | H04L 67/125 |
| 2020/0082377 A1 | 3/2020 | Song et al. | |
| 2021/0282019 A1* | 9/2021 | Jimenez | H04W 12/068 |
| 2023/0096672 A1* | 3/2023 | Bhat | G06Q 40/02 |
| | | | 726/27 |

FOREIGN PATENT DOCUMENTS

| | | |
|---|---|---|
| CN | 102968864 A | 3/2013 |
| CN | 103178966 A | 6/2013 |
| CN | 104378143 A | 2/2015 |
| CN | 104391712 A | 3/2015 |
| CN | 103875189 B | 6/2016 |
| CN | 107205102 A | 9/2017 |
| CN | 107610278 A | 1/2018 |
| CN | 107733652 A | 2/2018 |
| CN | 107851248 A | 3/2018 |
| CN | 107909358 A | 4/2018 |
| CN | 108665337 A | 10/2018 |
| CN | 108725383 A | 11/2018 |
| CN | 109391597 A | 2/2019 |
| CN | 109408120 A | 3/2019 |
| CN | 109586915 A | 4/2019 |
| JP | 2005273264 A | 10/2005 |
| JP | 2006227747 A | 8/2006 |
| JP | 2009215797 A | 9/2009 |
| JP | 2009286343 A | 12/2009 |
| JP | 2012215047 A | 11/2012 |
| JP | 2015095877 A | 5/2015 |
| JP | 2018071213 A | 5/2018 |
| JP | 2018160098 A | 10/2018 |
| WO | 2018146777 A1 | 8/2018 |

* cited by examiner

METHOD FOR AUTHENTICATING IDENTITY OF DIGITAL KEY, TERMINAL DEVICE, AND MEDIUM

CROSS-REFERENCE TO RELATED APPLICATIONS

This is a U.S. National Stage of International Patent Application No. PCT/CN2020/085225 filed on Apr. 17, 2020, which claims priority to Chinese Patent Application No. 201910324313.5 filed on Apr. 22, 2019. Both of the aforementioned applications are hereby incorporated by reference in their entireties.

TECHNICAL FIELD

This application relates to the field of digital key technologies, and specifically, to a method for authenticating an identity of a digital key, a terminal device, and a computer readable storage medium.

BACKGROUND

A digital key (Digital Key, DK) is opposite to a physical key (namely, an entity key)/a remote key (a key fob), and may use a terminal device, for example, a mobile phone or a wearable intelligent device, as a key carrier by using a communication technology, so that a user can perform service operations such as unlocking, locking, and starting a vehicle by using the terminal device.

FIG. 1 is a diagram of a system architecture involved when a digital key is used to unlock a vehicle. There is an authentication unit 810, an electronic control unit (Electronic Control Unit, ECU) 830, and a communication unit 820 in the vehicle. The authentication unit 810 stores an authentication key. There is a secure element (Secure Element, SE) 910 and a communication unit 920 in a mobile phone. The secure element 910 is a hardware unit with physical attack prevention and tamper prevention capabilities. The secure element 910 has an independent processor, can provide a secure running environment for a digital key applet (Digital Key Applet, DK Applet) 911 running therein, and can ensure security and confidentiality of an asset (for example, an authentication key) stored therein. During unlocking, the digital key applet 911 in the mobile phone responds to a service instruction sent by the vehicle, and sends, by using the communication unit 920, a service response message including a ciphertext to the communication unit 820 in the vehicle, where the ciphertext in the service response message is generated by using an authentication key. After the communication unit 820 in the vehicle receives the service response message including the ciphertext, the authentication unit 810 verifies the ciphertext by using an authentication key. The electronic control unit 830 determines, based on a verification result, whether to authorize unlocking. In this way, the unlocking operation can be realized by using the digital key.

Near field communication (Near Field Communication, NFC) is a short-range wireless communication technology. Power may be supplied to an NFC module and a secure element in a terminal device separately. Therefore, even if power is not supplied to a main chip of the terminal device, information can be exchanged between the terminal device and a vehicle by using the NFC module and the secure element independently. In other words, even if the terminal device is powered off, the service operations such as unlocking, locking, and starting the vehicle can be completed by using the terminal device.

Many terminal devices have an identity authentication system, in which identity authentication of a user can be completed by using a password, a fingerprint, a face, or the like. To enhance the security of the digital key, identity authentication can be added when the digital key is used. For example, the user may set that identity authentication is always required when the digital key is used, to prevent the digital key from being counterfeited. In this case, when the user performs the service operations such as unlocking and starting the vehicle by using the digital key, the user can use the digital key only after performing identity authentication on the terminal device. For another example, before unlocking and startup, the vehicle may alternatively actively initiate a request to require the user to perform identity authentication on the terminal device. However, an identity authentication system in each terminal device performs execution in a trusted execution environment (Trusted Execution Environment, TEE). An application running on the terminal device can initiate identity authentication and obtain an identity authentication result only by using a system service interface. That is, the identity authentication system can run only when the main chip of the terminal device is in a working state.

Therefore, when the terminal device is in a power-off state, the user cannot complete identity authentication. To implement a function of the digital key even if the terminal device is powered off when the terminal device is in the power-off state, identity authentication is often not performed when the digital key is used. Consequently, after obtaining a terminal device of an authorized user, an attacker can forcibly bypass, by powering off the terminal device, an identity authentication restriction set by the authorized user. In other words, the digital key has a security vulnerability.

SUMMARY

This application provides a method for authenticating an identity of a digital key, to resolve a problem that identity authentication cannot be completed by using a digital key when a terminal device is in a power-off state, and a security vulnerability exists.

According to a first aspect, this application provides a method for authenticating an identity of a digital key. The method includes:

a first terminal sends a service instruction to a second terminal;

the first terminal receives a service response message sent by the second terminal;

the first terminal obtains user identity authentication information after verification performed on the service response message by using a first key succeeds, where the first key is a key pre-agreed on by the second terminal and the first terminal, the user identity authentication information is stored in a secure element of the second terminal, the user identity authentication information includes a user identity authentication result, the user identity authentication result is generated by an identity authentication system of the second terminal before the second terminal enters a preset operating state, and the preset operating state is a state in which the identity authentication system of the second terminal cannot generate an identity authentication result; and the first terminal verifies the user identity authentication information.

By using this implementation, even if the second terminal is in the preset operating state (for example, a power-off or low battery mode), when a user uses a digital key in the second terminal, the first terminal can verify an identity of the user by using the user identity authentication information stored in the secure element of the second terminal before the second terminal enters the preset operating state. Therefore, by using this implementation, even if the second terminal is in the power-off or low battery mode, whether the user using the digital key in the second terminal is an authorized user of the second terminal can be verified, thereby improving security of using the digital key.

With reference to the first aspect, in a first possible implementation of the first aspect, the step that by the first terminal verifies the user identity authentication information includes:

if the user identity authentication result matches a preset authentication result, the first terminal authorizes a service operation corresponding to the service instruction.

By using this implementation, even if the second terminal is in the preset operating state (for example, the power-off or low battery mode), when the user uses the digital key in the second terminal, the first terminal can also perform verification by using the user identity authentication result and the preset authentication result to determine whether to authorize the service operation, thereby improving security of using the digital key, and reducing a risk that the first terminal is used by an unauthorized user.

With reference to the first aspect, in a second possible implementation of the first aspect, the step that the first terminal verifies the user identity authentication information includes:

if the user identity authentication result matches a preset authentication result and a total quantity of times for which the second terminal in the preset operating state authorizes a service operation is within a preset quantity threshold, the first terminal authorizes a service operation corresponding to the service instruction; or if the user identity authentication result matches a preset authentication result and frequency at which the second terminal in the preset operating state authorizes a service operation is within a preset frequency threshold, the first terminal authorizes a service operation corresponding to the service instruction.

By using this implementation, the first terminal may perform double verification by using the user identity authentication result and the total quantity of times for which or the frequency at which the second terminal in the preset operating state authorizes the service operation, thereby further improving the security of using the digital key. By restricting a case of using the digital key in the preset operating state, a risk of maliciously using the digital key in the second terminal that is in the preset operating state and that lacks real-time protection can be reduced.

With reference to the first aspect, in a third possible implementation of the first aspect, the user identity authentication information further includes a first timestamp, and the first timestamp is used to indicate a time of generating the identity authentication result; and the step that the first terminal verifies the user identity authentication information includes:

if the user identity authentication result matches a preset authentication result and interval duration between a current time and the first timestamp is within a preset duration threshold, the first terminal authorizes a service operation corresponding to the service instruction.

By using this implementation, the first terminal may perform double verification by using the user identity authentication result and the first timestamp, thereby further improving the security of using the digital key, and reducing the risk. By restricting the interval duration between the time of using the digital key in the preset operating state and the first timestamp, a risk of using the digital key in the second terminal that is in the preset operating state and that lacks real-time protection can be reduced.

With reference to any one of the first aspect and the first to the second implementations of the first aspect, in a fourth possible implementation of the first aspect, the method further includes:

if the second terminal switches from the preset operating state to a non-preset operating state after the time indicated by the first timestamp, the first terminal freezes the digital key, indicates the second terminal to freeze the digital key, or indicates a user to perform identity authentication again.

By using this implementation, whether currently provided identity authentication information is the newest user identity authentication information can be determined by determining whether the second terminal switches from the preset operating state to the non-preset operating state after the time indicated by the first timestamp, so as to determine whether the second terminal has abnormal behavior in a current service. If the second terminal has abnormal behavior, some protective measures can be taken, for example, freezing the digital key or indicating the user to perform identity authentication again. Therefore, based on the foregoing single or double verification, this time of verification can be added to further reduce the risk of using the digital key.

With reference to the first aspect, in a fifth possible implementation of the first aspect, the user identity authentication information further includes a first timestamp, and the first timestamp is used to indicate a time of generating the identity authentication result; and the step that the first terminal verifies the user identity authentication information includes:

if the user identity authentication result matches a preset authentication result and the second terminal does not switch from the preset operating state to a non-preset operating state after the time indicated by the first timestamp, the first terminal authorizes a service operation corresponding to the service instruction.

By using this implementation, the first terminal may perform double verification by using the user identity authentication result and the first timestamp, thereby further improving the security of using the digital key. Whether currently provided identity authentication information is the newest user identity authentication information can be determined by determining whether the second terminal switches from the preset operating state to the non-preset operating state after the time indicated by the first timestamp, so as to determine whether the second terminal has abnormal behavior in a current service. Therefore, this time of verification can be added to further reduce the risk of using the digital key.

With reference to the first aspect, in a sixth possible implementation of the first aspect, the service instruction includes a first instruction and a second instruction, the service operation includes a first operation corresponding to the first instruction and a second operation corresponding to the second instruction, the user identity authentication information further includes a first timestamp, and the first timestamp is used to indicate a time of generating the identity authentication result; and the step that the first terminal verifies the user identity authentication information includes:

if the user identity authentication result matches a preset authentication result, the first terminal authorizes the first operation corresponding to the first instruction; and after the first operation is authorized, if a total quantity of times for which the second terminal in the preset operating state authorizes the service operation is within a preset quantity threshold, frequency at which the second terminal in the preset operating state authorizes the service operation is within a preset frequency threshold, interval duration between a current time and the first timestamp is within a preset duration threshold, or the second terminal does not switch from the preset operating state to a non-preset operating state after the time indicated by the first timestamp, the first terminal authorizes the second operation corresponding to the second instruction.

By using this implementation, when the service instruction includes a plurality of instructions, the first terminal can verify different service instructions by using different verification conditions and by using the user identity authentication result, the total quantity of times for which or the frequency at which the second terminal in the preset operating state authorizes the service operation, and the first timestamp, thereby further improving the security of using the digital key.

With reference to the first aspect, in a seventh possible implementation of the first aspect, the service instruction includes a first instruction and a second instruction, the service operation includes a first operation corresponding to the first instruction and a second operation corresponding to the second instruction, the user identity authentication information further includes a first timestamp, and the first timestamp is used to indicate a time of generating the identity authentication result; and the step that the first terminal verifies the user identity authentication information includes:

if the user identity authentication result matches a preset authentication result, the first terminal authorizes the first operation corresponding to the first instruction:

if interval duration between a current time and the first timestamp is beyond a preset duration threshold, the first terminal determines whether the second terminal switches from the preset operating state to a non-preset operating state after the time indicated by the first timestamp; and if the second terminal does not switch to the non-preset operating state, the first terminal authorizes the second operation corresponding to the second instruction.

By using this implementation, when the service instruction includes a plurality of instructions, the first terminal can verify different service instructions by using different verification conditions and by using the user identity authentication result and the first timestamp, thereby further improving the security of using the digital key.

With reference to the first aspect, in an eighth possible implementation of the first aspect, the service instruction includes a first instruction and a second instruction, the service operation includes a first operation corresponding to the first instruction and a second operation corresponding to the second instruction, the user identity authentication information further includes a first timestamp, and the first timestamp is used to indicate a time of generating the identity authentication result; and the step that the first terminal verifies the user identity authentication information includes:

if the user identity authentication result matches a preset authentication result and interval duration between a current time and the first timestamp is within a preset duration threshold, the first terminal authorizes the first operation corresponding to the first instruction; and after the first operation is authorized, if the second terminal does not switch from the preset operating state to a non-preset operating state after the time indicated by the first timestamp, the first terminal authorizes the second operation corresponding to the second instruction.

By using this implementation, when the service instruction includes a plurality of instructions, the first terminal can verify different service instructions by using different verification conditions and by using the user identity authentication result and the first timestamp, thereby further improving the security of using the digital key.

With reference to any one of the first aspect and the fifth to the eighth implementations of the first aspect, in a ninth possible implementation of the first aspect, the step that the first terminal verifies the user identity authentication information further includes:

if the second terminal switches from the preset operating state to the non-preset operating state after the time indicated by the first timestamp, the first terminal freezes the digital key, indicates the second terminal to freeze the digital key, or indicates a user to perform identity authentication again.

By using this implementation, whether currently provided identity authentication information is the newest user identity authentication information can be determined by determining whether the second terminal switches from the preset operating state to the non-preset operating state after the time indicated by the first timestamp, so as to determine whether the second terminal has abnormal behavior in a current service. If the second terminal has abnormal behavior, some protective measures can be taken, for example, freezing the digital key or indicating the user to perform identity authentication again. Therefore, based on the foregoing verification, this time of verification can be added to further reduce the risk of using the digital key.

With reference to any one of the first aspect and the fifth to the ninth implementations of the first aspect, in a tenth possible implementation of the first aspect, the determining whether the second terminal switches from the preset operating state to a non-preset operating state after the time indicated by the first timestamp includes:

receiving a second timestamp sent by a server, where the second timestamp is used to indicate a time, within a time period in which the second terminal switches from the preset operating state to the non-preset operating state, closest to a time at which the second terminal sends the service response message; and if the second timestamp is earlier than the first timestamp, the first terminal determines that the second terminal does not switch from the preset operating state to the non-preset operating state after the time indicated by the first timestamp; or if the second timestamp is later than the first timestamp, the first terminal determines that the second terminal switches from the preset operating state to the non-preset operating state after the time indicated by the first timestamp.

By using this implementation, the first terminal can locally determine whether the second terminal switches from the preset operating state to the non-preset operating state after the time indicated by the first timestamp.

With reference to any one of the first aspect and the fifth to the ninth implementations of the first aspect, in an eleventh possible implementation of the first aspect, the determining whether the second terminal switches from the preset operating state to a non-preset operating state after the time indicated by the first timestamp includes:

the first terminal sends the first timestamp to a server;

the first terminal obtains an online verification result sent by the server, where the online verification result is determined by the server based on whether the second terminal switches from the preset operating state to the non-preset operating state after the time indicated by the first timestamp; and if the online verification result is a success, the first terminal determines that the second terminal does not switch from the preset operating state to the non-preset operating state after the time indicated by the first timestamp; or if the online verification result is a failure, the first terminal determines that the second terminal switches from the preset operating state to the non-preset operating state after the time indicated by the first timestamp.

By using this implementation, online verification can be performed on the remote server, and the server determines whether the second terminal switches from the preset operating state to the non-preset operating state after the time indicated by the first timestamp.

With reference to the first aspect, in a twelfth possible implementation ofthe first aspect, the service instruction includes a first instruction and a second instruction, and the service operation includes a first operation corresponding to the first instruction and a second operation corresponding to the second instruction:

the step that the first terminal verifies the user identity authentication information includes:

if the user identity authentication result does not match a preset authentication result, the first terminal authorizes the first operation corresponding to the first instruction; and if the user identity authentication result does not match the preset authentication result, the first terminal refuses to authorize the second operation corresponding to the second instruction; and the method further includes:

the first terminal sends a new service instruction to the second terminal, where the new service instruction includes a second instruction.

By using this implementation, when the service instruction includes a plurality of instructions, the first terminal can verify, different service instructions by using the user identity authentication result and the like. Regardless of whether verification on the user identity authentication result succeeds, to improve user experience, authorization can be granted to some service operations of lower risks, and authorization can be denied to some other service operations with higher risks. Then, a new service instruction is initiated to verify whether to authorize a service operation that has not been authorized.

With reference to the first aspect, in a thirteenth possible implementation of the first aspect, the service response message further includes second verification data, and the second verification data is generated by processing the user identity authentication information by using a second key; and the step that the first terminal verifies the user identity authentication information includes:

if it is verified, by using the second key and the second verification data, that the user identity authentication information is valid and the user identity authentication information conforms to a preset security policy, the first terminal authorizes a service operation corresponding to the service instruction, where the second key is a key pre-agreed on by the second terminal and the first terminal, and the second key is different from the first key.

By using this implementation, before whether to authorize the service operation is verified by using the user identity authentication information, the user identity authentication information is first verified by using the second key and the second verification data. In this way, it can be ensured that the user identity authentication information has not been tampered with in a transmission process, that is, integrity of the user identity authentication information can be ensured. In addition, it can be ensured that a source for sending the user identity authentication information is authorized, that is, an authorized holder of the key in the second terminal is ensured.

According to a second aspect, this application provides a method for authenticating an identity of a digital key. The method includes:

a second terminal receives a service instruction from a first terminal, and the second terminal in a preset operating state sends, to the first terminal in response to the service instruction, a service response message processed by using a first key, where the service response message includes user identity authentication information, the user identity authentication information is stored in a secure element of the second terminal, the user identity authentication information includes a user identity authentication result, the user identity authentication result is generated by an identity authentication system of the second terminal before the second terminal enters the preset operating state, the preset operating state is a state in which the identity authentication system of the second terminal cannot generate an identity authentication result, and the first key is a key pre-agreed on by the second terminal and the first terminal.

By using this implementation, before the second terminal enters the preset operating state, the second terminal needs to authenticate an identity of a user, and stores the user identity authentication information in the secure element of the second terminal. When the second terminal is in the preset operating state (for example, a power-off or low battery mode), if the user uses the digital key in the second terminal, the second terminal may send the user identity authentication information in the secure element to the first terminal, so that the first terminal can use the information for verification. Therefore, by using this implementation, it can be ensured that it is an authorized user of the second terminal who is using the digital key in the second terminal, thereby improving security of using the digital key when the second terminal is in the preset operating state.

With reference to the second aspect, in a first possible implementation of the second aspect, the user identity authentication information further includes a first timestamp, and the first timestamp is used to indicate a time of generating the user identity authentication result.

By using this implementation, the first terminal can perform double or even triple verification by using the user identity authentication result and the first timestamp, and can also separately verify different service instructions by using the user identity authentication result and the first timestamp, thereby further improving the security of using the digital key.

With reference to the second aspect or the first implementation of the second aspect, in a second possible implementation of the second aspect, the service response message further includes second verification data, the second verification data is generated by processing the user identity authentication information by using a second key, the second key is a key pre-agreed on by the second terminal and the first terminal, and the second key is different from the first key.

By using this implementation, before the first terminal verifies, by using the user identity authentication information, whether to authorize the service operation, the user identity authentication information may first be verified by using the second key and the second verification data. In this way, it can be ensured that the user identity authentication information has not been tampered with in a transmission process, that is, integrity of the user identity authentication information can be ensured. In addition, it can be ensured that a source for sending the user identity authentication information is authorized, that is, an authorized holder of the key in the second terminal is ensured.

With reference to any one of the second aspect and the first to the second implementations of the second aspect, in a third possible implementation of the second aspect, before the step that a second terminal receives a service instruction from a first terminal, the method further includes:

if a digital key configured with mandatory identity authentication exists before the second terminal enters the preset operating state, generating the user identity authentication result, where the digital key configured with mandatory identity authentication requires the second terminal to perform user identity authentication before the second terminal enters the preset operating state; and the second terminal stores the user identity authentication information in the secure element of the second terminal, where the user identity authentication information includes the user identity authentication result.

By using this implementation, before the second terminal enters the preset operating state, the second terminal needs to perform user identity authentication on the digital key configured with mandatory identity authentication, and stores the user identity authentication information in the secure element of the second terminal. In this way, even if the digital key needs to be used when the second terminal is in the preset operating state (for example, the power-off or low battery mode), the second terminal can still send the user identity authentication information in the secure element to the first terminal, so that the first terminal can use the information for verification, thereby improving the security of using the digital key when the second terminal is in the preset operating state.

According to a third aspect, this application provides a terminal device. The terminal device includes:

a first transceiver, configured to: send a service instruction to a second terminal, and receive a service response message sent by the second terminal; and a processor, configured to: obtain user identity authentication information after verification performed on the service response message by using a first key succeeds, and verify the user identity authentication information, where the first key is a key pre-agreed on by the second terminal and the terminal device, the user identity authentication information is stored in a secure element of the second terminal, the user identity authentication information includes a user identity authentication result, the user identity authentication result is generated by an identity authentication system of the second terminal before the second terminal enters a preset operating state, and the preset operating state is a state in which the identity authentication system of the second terminal cannot generate an identity authentication result.

With reference to the third aspect, in a first possible implementation of the third aspect, the processor is further configured to: if the user identity authentication result matches a preset authentication result, authorize a service operation corresponding to the service instruction.

With reference to the third aspect, in a second possible implementation of the third aspect, the processor is further configured to: if the user identity authentication result matches a preset authentication result and a total quantity of times for which the second terminal in the preset operating state authorizes a service operation is within a preset quantity threshold, authorize a service operation corresponding to the service instruction; or the processor is further configured to: if the user identity authentication result matches a preset authentication result and frequency at which the second terminal in the preset operating state authorizes a service operation is within a preset frequency threshold, authorize a service operation corresponding to the service instruction.

With reference to the third aspect, in a third possible implementation of the third aspect, the processor is further configured to: if the user identity authentication result matches a preset authentication result and interval duration between a current time and the first timestamp is within a preset duration threshold, authorize a service operation corresponding to the service instruction.

With reference to any one of the third aspect and the first to the second implementations of the third aspect, in a fourth possible implementation of the third aspect, the processor is further configured to: if the second terminal switches from the preset operating state to a non-preset operating state after the time indicated by the first timestamp, freeze the digital key, indicate the second terminal to freeze the digital key, or indicate the user to perform identity authentication again.

With reference to the third aspect, in a fifth possible implementation of the third aspect, the processor is further configured to: if the user identity authentication result matches a preset authentication result and the second terminal does not switch from the preset operating state to a non-preset operating state after the time indicated by the first timestamp, authorize a service operation corresponding to the service instruction, where the user identity authentication information further includes a first timestamp, and the first timestamp is used to indicate a time of generating the identity authentication result.

With reference to the third aspect, in a sixth possible implementation of the third aspect, the processor is further configured to: if the user identity authentication result matches a preset authentication result, authorize the first operation corresponding to the first instruction; and after the first operation is authorized, if a total quantity of times for which the second terminal in the preset operating state authorizes the service operation is within a preset quantity threshold, authorize the second operation corresponding to the second instruction; if frequency at which the second terminal in the preset operating state authorizes the service operation is within a preset frequency threshold, authorize the second operation corresponding to the second instruction; if interval duration between a current time and the first timestamp is within a preset duration threshold, authorize the second operation corresponding to the second instruction; or if the second terminal does not switch from the preset operating state to a non-preset operating state after the time indicated by the first timestamp, authorize the second operation corresponding to the second instruction. The service instruction includes a first instruction and a second instruction, the service operation includes a first operation corresponding to the first instruction and a second operation corresponding to the second instruction, the user identity authentication information further includes a first timestamp, and the first timestamp is used to indicate a time of generating the identity authentication result.

With reference to the third aspect, in a seventh possible implementation of the third aspect, the processor is further configured to: if the user identity authentication result matches a preset authentication result, authorize the first operation corresponding to the first instruction; if interval duration between a current time and the first timestamp is beyond a preset duration threshold, determine whether the second terminal switches from the preset operating state to a non-preset operating state after the time indicated by the first timestamp; and if the second terminal does not switch to the non-preset operating state, authorize the second operation corresponding to the second instruction. The service instruction includes a first instruction and a second instruction, the service operation includes a first operation corresponding to the first instruction and a second operation corresponding to the second instruction, the user identity authentication information further includes a first timestamp, and the first timestamp is used to indicate a time of generating the identity authentication result.

With reference to the third aspect, in an eighth possible implementation of the third aspect, the processor is further configured to: if the user identity authentication result matches a preset authentication result and interval duration between a current time and the first timestamp is within a preset duration threshold, authorize the first operation corresponding to the first instruction; and after the first operation is authorized, if the second terminal does not switch from the preset operating state to a non-preset operating state after the time indicated by the first timestamp, authorize the second operation corresponding to the second instruction. The service instruction includes a first instruction and a second instruction, the service operation includes a first operation corresponding to the first instruction and a second operation corresponding to the second instruction, the user identity authentication information further includes a first timestamp, and the first timestamp is used to indicate a time of generating the identity authentication result.

With reference to any one of the third aspect and the fifth to the eighth implementations of the third aspect, in a ninth possible implementation of the third aspect, when the second terminal switches from the preset operating state to the non-preset operating state after the time indicated by the first timestamp, the processor is further configured to freeze the digital key, or indicate the second terminal to freeze the digital key, or indicate the user to perform identity authentication again.

With reference to any one of the third aspect and the fifth to the ninth implementations of the third aspect, in a tenth possible implementation of the third aspect, the terminal device further includes:

a third transceiver, configured to receive a second timestamp sent by a server, where the second timestamp is used to indicate a time, within a time period in which the second terminal switches from the preset operating state to the non-preset operating state, closest to a time at which the second terminal sends the service response message; and the processor is further configured to: if the second timestamp is earlier than the first timestamp, determine that the second terminal does not switch from the preset operating state to the non-preset operating state after the time indicated by the first timestamp; or if the second timestamp is later than the first timestamp, determine that the second terminal switches from the preset operating state to the non-preset operating state after the time indicated by the first timestamp.

With reference to any one of the third aspect and the fifth to the ninth implementations of the third aspect, in an eleventh possible implementation of the third aspect, the terminal device further includes:

a third transceiver, configured to: send the first timestamp to a server, and receive an online verification result sent by the server, where the online verification result is determined by the server based on whether the second terminal switches from the preset operating state to the non-preset operating state after the time indicated by the first timestamp; and the processor is further configured to: if the online verification result is a success, determine that the second terminal does not switch from the preset operating state to the non-preset operating state after the time indicated by the first timestamp; or if the online verification result is a failure, determine that the second terminal switches from the preset operating state to the non-preset operating state after the time indicated by the first timestamp.

With reference to the third aspect, in a twelfth possible implementation of the third aspect, the processor is further configured to: if the user identity authentication result does not match a preset authentication result, authorize a first operation corresponding to the first instruction, and refuse to authorize a second operation corresponding to the second instruction, where the service instruction includes the first instruction and the second instruction, and the service operation includes the first operation corresponding to the first instruction and the second operation corresponding to the second instruction; and the first transceiver is further configured to send a new service instruction to the second terminal, where the new service instruction includes the second instruction.

With reference to the third aspect, in a thirteenth possible implementation of the third aspect, the processor is further configured to: if it is verified, by using a second key and the second verification data, that the user identity authentication information is valid and the user identity authentication information conforms to a preset security policy, authorize a service operation corresponding to the service instruction, where the service response message further includes the second verification data, the second verification data is generated by processing the user identity authentication information by using the second key, the second key is a key pre-agreed on by the second terminal and the first terminal, and the second key is different from the first key.

According to a fourth aspect, this application provides a terminal device. The terminal device includes:

a second transceiver, configured to: receive a service instruction from a first terminal; and in a preset operating state, send, to the first terminal in response to the service instruction, a service response message processed by using a first key, where the service response message includes user identity authentication information, the user identity authentication information includes a user identity authentication result, and the first key is a key pre-agreed on by the second terminal and the first terminal;

a secure element, configured to store the user identity authentication information and the first key; and a user identity authentication system, configured to generate the user identity authentication result before the terminal device enters the preset operating state, where the preset operating state is a state in which the identity authentication system of the terminal device cannot generate an identity authentication result.

With reference to the fourth aspect, in a first possible implementation of the fourth aspect, the user identity authentication information further includes a first timestamp, and the first timestamp is used to indicate a time of generating the user identity authentication result.

With reference to the fourth aspect or the first implementation of the fourth aspect, in a second possible implementation of the fourth aspect, the service response message further includes second verification data, the second verification data is generated by processing the user identity authentication information by using a second key, the second key is a key pre-agreed on by the terminal device and the first terminal, and the second key is different from the first key.

With reference to the fourth aspect and the first to the second implementations of the fourth aspect, in a third possible implementation of the fourth aspect, before the terminal device enters the preset operating state, when a digital key configured with mandatory identity authentication exists in the terminal device, the user identity authentication system is further configured to generate the user identity authentication result, where the digital key configured with mandatory identity authentication requires the second terminal to perform user identity authentication before the second terminal enters the preset operating state; and the second terminal further includes:

a digital key service, configured to store the user identity authentication information in a secure element of the terminal device, and the user identity authentication information includes the user identity authentication result.

According to a fifth aspect, this application provides a computer readable storage medium, including instructions. When the instructions are run on a computer, the computer is enabled to perform the method according to the first aspect.

According to a sixth aspect, this application provides a computer readable storage medium, including instructions. When the instructions are run on a computer, the computer is enabled to perform the method according to the second aspect.

According to a seventh aspect, this application provides a computer program product including instructions. When the instructions are run on a computer, the computer is enabled to perform the method according to the first aspect.

According to an eighth aspect, this application provides a computer program product including instructions. When the instructions are run on a computer, the computer is enabled to perform the method according to the second aspect.

Beneficial effects of using the foregoing terminal device and the computer readable storage medium are the same as beneficial effects of the methods for authenticating an identity of a digital key according to the first aspect and the second aspect, and details are not described herein again.

BRIEF DESCRIPTION OF DRAWINGS

To describe technical solutions of this application more clearly, the following briefly describes the accompanying drawings in the embodiments.

DESCRIPTION OF EMBODIMENTS

Figure 1:
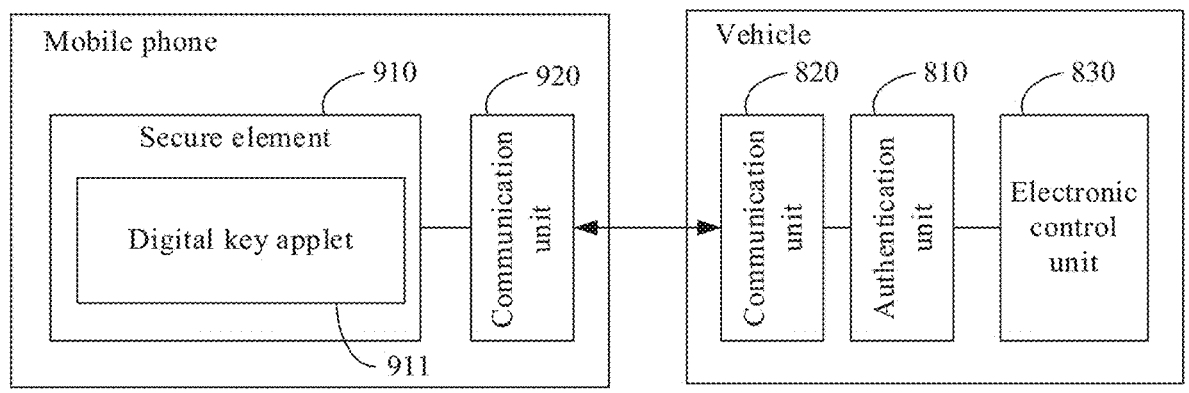
FIG. 1 is a diagram of a system architecture involved when a digital key is used to unlock a vehicle.
Figure 2:
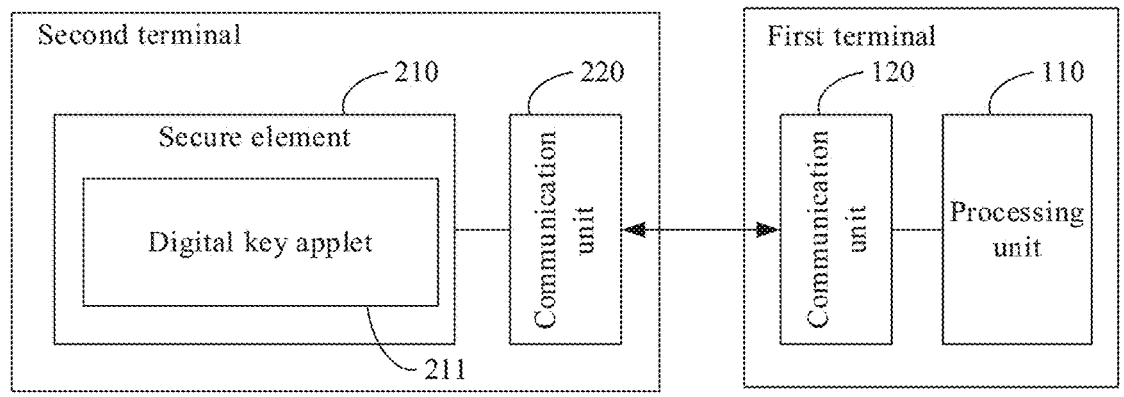
FIG. 2 is a schematic diagram of an application scenario of a method for authenticating an identity of a digital key according to an embodiment of this application.

FIG. 2 is a schematic diagram of an application scenario of a method for authenticating an identity of a digital key according to an embodiment of this application.

In FIG. 2, a second terminal is a terminal having a digital key. The second terminal includes a secure element 210, and a digital key applet 211 stores at least one digital key. Because power can be supplied to the secure element 210 and a main chip (not shown in the figure) of the second terminal independently, the secure element 210 may be powered on and work regardless of which state the main chip is in. The digital key applet 211 may be run in the secure element 210 to implement a function of the digital key. The second terminal may include a cellphone (cellphone), a smartphone (smartphone), a computer (computer), a tablet computer (tablet computer), a personal digital assistant (personal digital assistant, PDA), a mobile internet device (mobile Internet device, MID), a wearable device, or the like.

The second terminal and a first terminal respectively have a communication unit 220 and a communication unit 120, and the two terminals perform interaction by using the two communication units. The communication units 220 and 120 may use a medium-range communication technology such as Bluetooth or an ultra-wideband (Ultra-Wideband, UWB) technology, or may use a short-range wireless communication technology such as near field communication (Near Field Communication, NFC). In addition, the communication units may use the plurality of foregoing communications technologies together, so as to cope with various application scenarios. In this embodiment of this application, the communication units of the first terminal and the second terminal, such as NFC modules, can be powered on independently of the main chips, and work independently by using an internal/external power supply when the main chips are not powered on. The foregoing external power supply is a power supply manner in which energy is obtained from an electromagnetic field to supply power to a communication module. The foregoing internal power supply is a power supply manner in which a power supply of the second terminal is not completely consumed, and a small amount of electricity is reserved to supply power to a communication module. It should be noted that if a communication unit using technologies such as the Bluetooth and UWB can be powered on and work independently of the main chip, the communication module using these technologies may be applied to the first terminal in this application alone or together with another communication module.

The first terminal is a terminal for verifying validity of the digital key in the second terminal. After obtaining information received by the communication unit 120, a processing unit 110 in the first terminal verifies validity of the digital key by using the received information. When verifying that a digital key is valid, the processing unit 110 sends a signal to an execution unit (not shown) in the first terminal, so that the execution unit performs a preset or user-specified operation.

The digital key in this application may be applied to a plurality of scenarios. For example, in an application scenario in which the digital key is used as a vehicle key, the second terminal may be a mobile phone, a tablet computer, an intelligent wearable device, or the like; and the first terminal may be a vehicle. For another example, in a scenario in which the digital key is used for payment, the second terminal may be a mobile phone, a tablet computer, an intelligent wearable device, or the like; and the first terminal may be a point of sale (point of sale. POS) terminal, a traffic card swipe machine, or the like. For still another example, in an application scenario in which the digital key is used as a door key, the second terminal may be a mobile phone, a tablet computer, an intelligent wearable device, or the like; and the first terminal may be an access control system.

In addition to a situation in which a terminal device is in a power-off state, when the terminal device is in a mode in which an identity authentication system of the terminal device cannot work (which is referred to as a low battery mode below), even though the terminal device is not powered off the terminal device still cannot satisfy a requirement of performing identity authentication when a digital key is used.

In view of this, in a first embodiment of this application, a method for authenticating an identity of a digital key is provided. Before the second terminal enters a preset operating state (for example, a power-off or low battery mode) from a non-preset operating state (for example, a normal battery mode), first, identity authentication is performed on a user by using an identity authentication system of the second terminal, and obtained identity authentication information is stored in the secure element of the second terminal. Then, when the digital key in the second terminal needs to be used, the user identity authentication information stored in the secure element is sent to the first terminal, and the first terminal may determine, based on the user identity authentication information, whether the user is an authorized holder of the second terminal. In this way, even if the second terminal is in the preset operating state (for example, the power-off or low battery mode), when the user uses the digital key in the second terminal, verification on a user identity may be added on the basis of an original digital key. Therefore, it is ensured that the user using the digital key in the second terminal is an authorized user of the second terminal, thereby improving security of using the digital key. In addition, this also avoids a loss caused to the authorized user of the second terminal if an unauthorized user of the second terminal bypasses the identity authentication step by powering off the second terminal or making the second terminal enter the low-power mode.

For two phases: before the second terminal enters the preset operating state from the non-preset operating state and the user uses the digital key when the second terminal is in the preset operating state, the following separately describes steps performed by the first terminal and the second terminal in the two phases.

Figure 3:
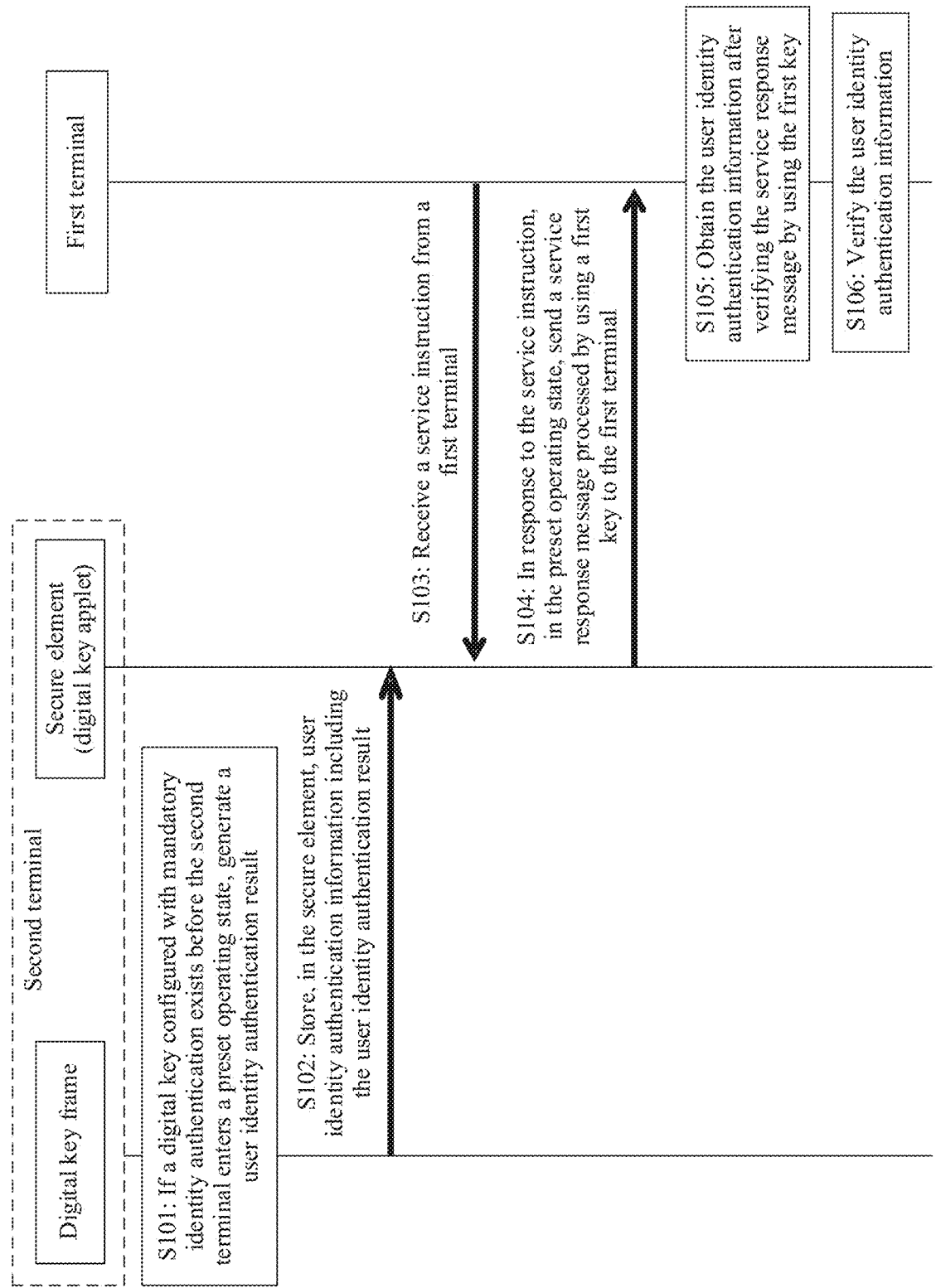
FIG. 3 is a schematic flowchart of an embodiment of a method for authenticating an identity of a digital key according to this application.

Phase 1: Before the Second Terminal Enters the Preset Operating State from the Non-Preset Operating State FIG. 3 is a schematic flowchart of an embodiment of a method for authenticating an identity of a digital key according to this application. In phase 1, the second terminal may perform steps S110 and S102.

S101: If a digital key configured with mandatory identity authentication exists before the second terminal enters the preset operating state, generate a user identity authentication result.

The preset operating state may be a state in which the identity authentication system of the second terminal cannot generate an identity authentication result, for example, the power-off or low battery mode. For example, when an amount of electricity of a power supply of the second terminal is less than a preset threshold, for example, 5%, the second terminal enters the low battery mode. In this case, only a small quantity of components in the second terminal work normally, and most components, such as the identity authentication system and a display screen, enter a non-working state. The non-preset operating state may be a state other than the preset operating state. For example, the second terminal is in a normal battery mode.

The digital key configured with mandatory identity authentication requires the second terminal to perform user identity authentication before the second terminal enters the preset operating state. Optionally, in an implementation, the second terminal may include a digital key service. The digital key service provides a digital key management function. Through a management interface of the digital key service, the user can view one or more digital keys stored in the digital key applet and perform mandatory identity authentication configuration on these digital keys. If the user configures mandatory authentication for a digital key, the user is required to perform authentication each time the digital key is used.

Optionally, after the user performs mandatory identity authentication configuration on the digital key, the second terminal may notify the first terminal via a wireless network, so that the first terminal performs a related check when authorizing a service operation.

When switching from the non-preset operating state to the preset operating state, the second terminal needs to enter a state switching procedure to perform a series of preset operations. For example, when the second terminal directly switches from a normal battery mode to a power-off state, the second terminal enters a power-off procedure to perform an operation preset in the power-off procedure, for example, displaying a dialog box for confirming power-off, or sending a broadcast to each application program to prompt storing data. For another example, when the second terminal directly switches from a normal battery mode to a low battery mode, the second terminal enters a low battery processing procedure to perform an operation preset in the low power processing procedure, for example, sound prompt, dialog prompt, display screen brightness adjustment, disabling or suspending a program running in the background. The digital key service can add an identity authentication operation to the state switching procedure when the user has been configured with at least one digital key with mandatory identity authentication. That is, when the second terminal enters the state switching procedure of switching from the non-preset operating state to the preset operating state, the second terminal starts the identity authentication system of the second terminal to perform identity authentication on the user and generate a user identity authentication result. Optionally, the foregoing identity authentication procedure may be triggered by the digital key service.

It should be noted that the identity authentication system may perform identity authentication on the user by using one or more existing identity authentication means, for example, a personal identification number (Personal Identification Number, PIN), a fingerprint, a face, an iris, bone conduction, and behavior-based authentication. The existing identity authentication means may include an active identity authentication means, for example, a PIN number, a fingerprint, a face, or an iris. All of these means need to be performed by the user according to guidance on a user interface of the second terminal. In addition, the existing identity authentication means may further include a passive (that is, user-senseless) identity authentication means, for example, behavior-based identity authentication or wearable device-based identity authentication. The wearable device-based identity authentication may be wearable presence detection, wearable bone conduction identity authentication, wearable pulse identity authentication, or the like. The passive identity authentication means may be implemented by using a component (for example, a sensor) of the second terminal, or may be implemented by using a third terminal (for example, a wearable device) that can interact with the second terminal. This is not limited in this application. Which one or more identity authentication means are used in actual application mainly depends on an identity authentication capability provided or supported by the identity authentication system of the second terminal. The identity authentication system collects a password, a biometric feature, or other authentication data input by the user, and then compares the password, the biometric feature, or the other authentication data with a pre-stored password, a pre-stored biometric feature, or pre-stored other authentication data to generate a user identity authentication result.

Figure 4:
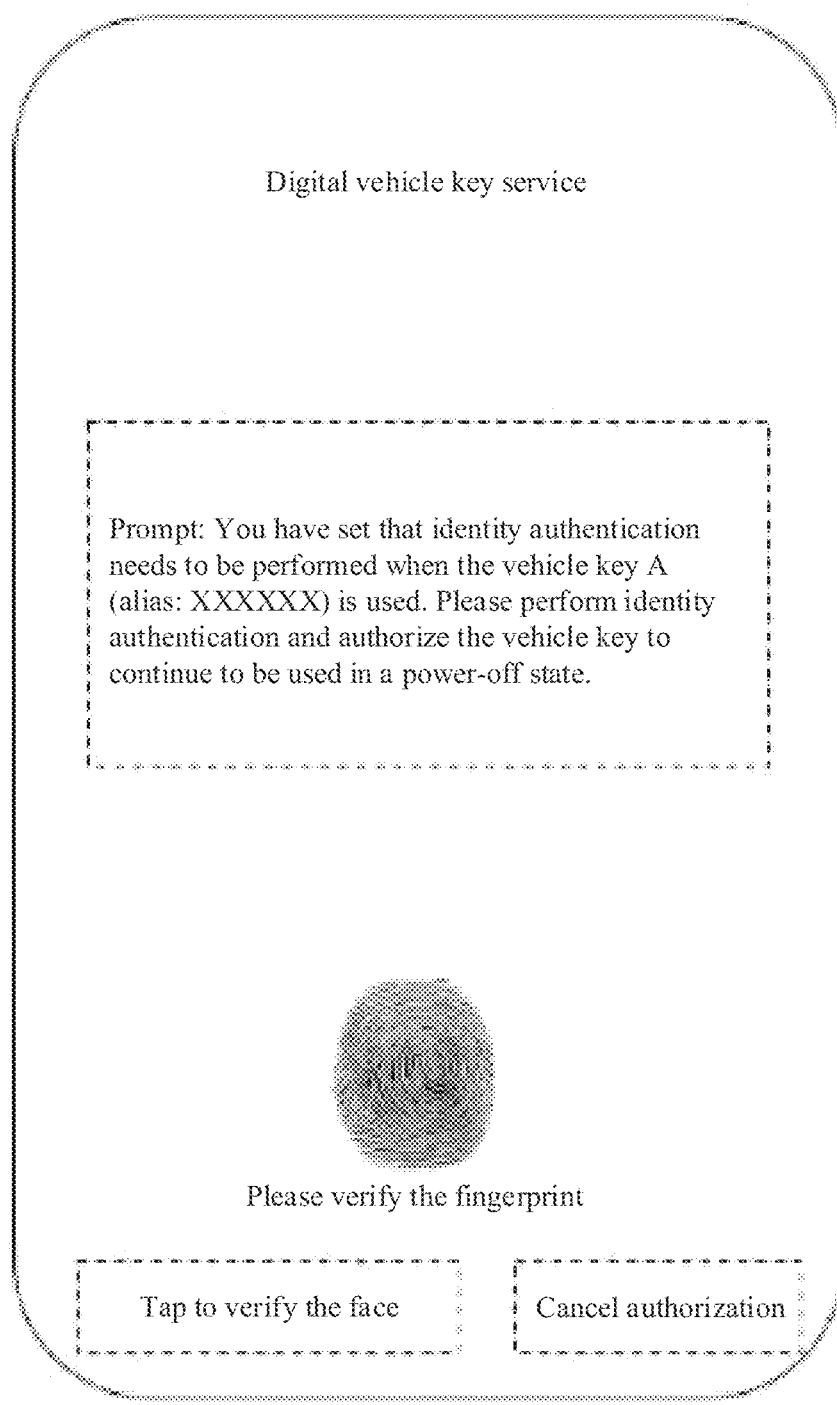
FIG. 4 is a schematic diagram of a user interface when identity authentication is performed in an example of an application scenario in which a digital key is used as a vehicle key.

Optionally, in a process of performing identity authentication, the digital key service may generate a user interface to notify the user of a purpose of the currently performed identity authentication. For example, the current identity authentication is used to authorize use of at least one digital key in the preset operating state. In addition, the user interface may further display guidance information to guide the user to complete identity authentication. For example, FIG. 4 is a schematic diagram of a user interface when identity authentication is performed in an example of an application scenario in which a digital key is used as a vehicle key. In the user interface in FIG. 4, prompt text in a middle area is used to notify the user that the current identity authentication is used to authorize use of a digital key A in a power-off state. Images and text in a lower area are used to indicate that the user can use a fingerprint or a face for identity authentication or indicate authorization cancellation.

Figure 5:
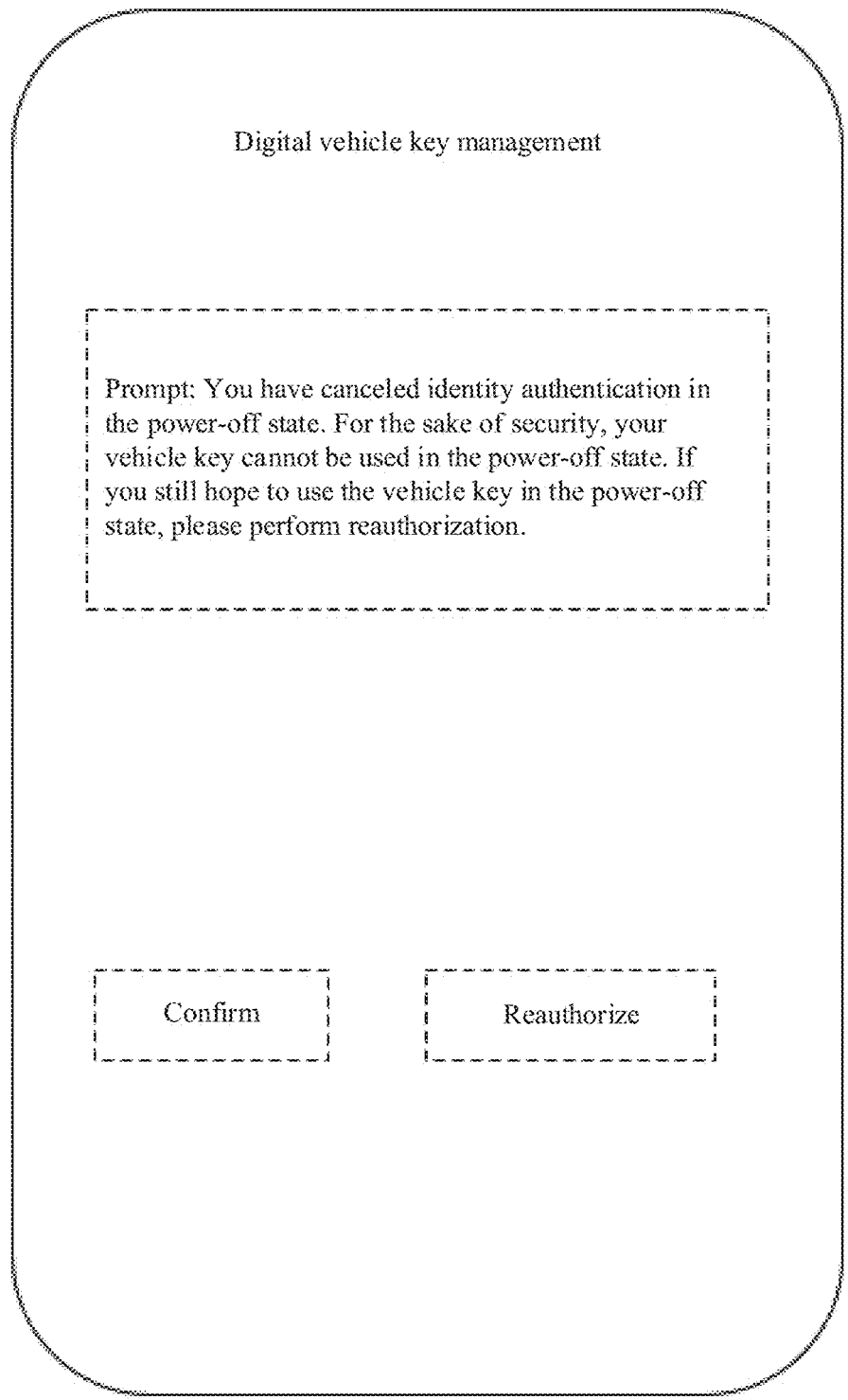
FIG. 5 is a schematic diagram of a user interface when a user cancels authorization in an example of an application scenario in which a digital key is used as a vehicle key.

Optionally, in an implementation, if the user cancels authorization, another user interface may further be generated to notify the user of a consequence of authorization cancellation and ask the user to perform confirmation. For example, FIG. 5 is a schematic diagram of a user interface when a user cancels authorization in an example of an application scenario in which a digital key is used as a vehicle key. In the user interface in FIG. 5, prompt text in an upper area is used to notify the user of a consequence of authorization cancellation, to be specific, the digital vehicle key cannot be used in a power-off state. Text in a lower area is used to indicate the user to perform confirmation or reauthorization.

Figure 6:
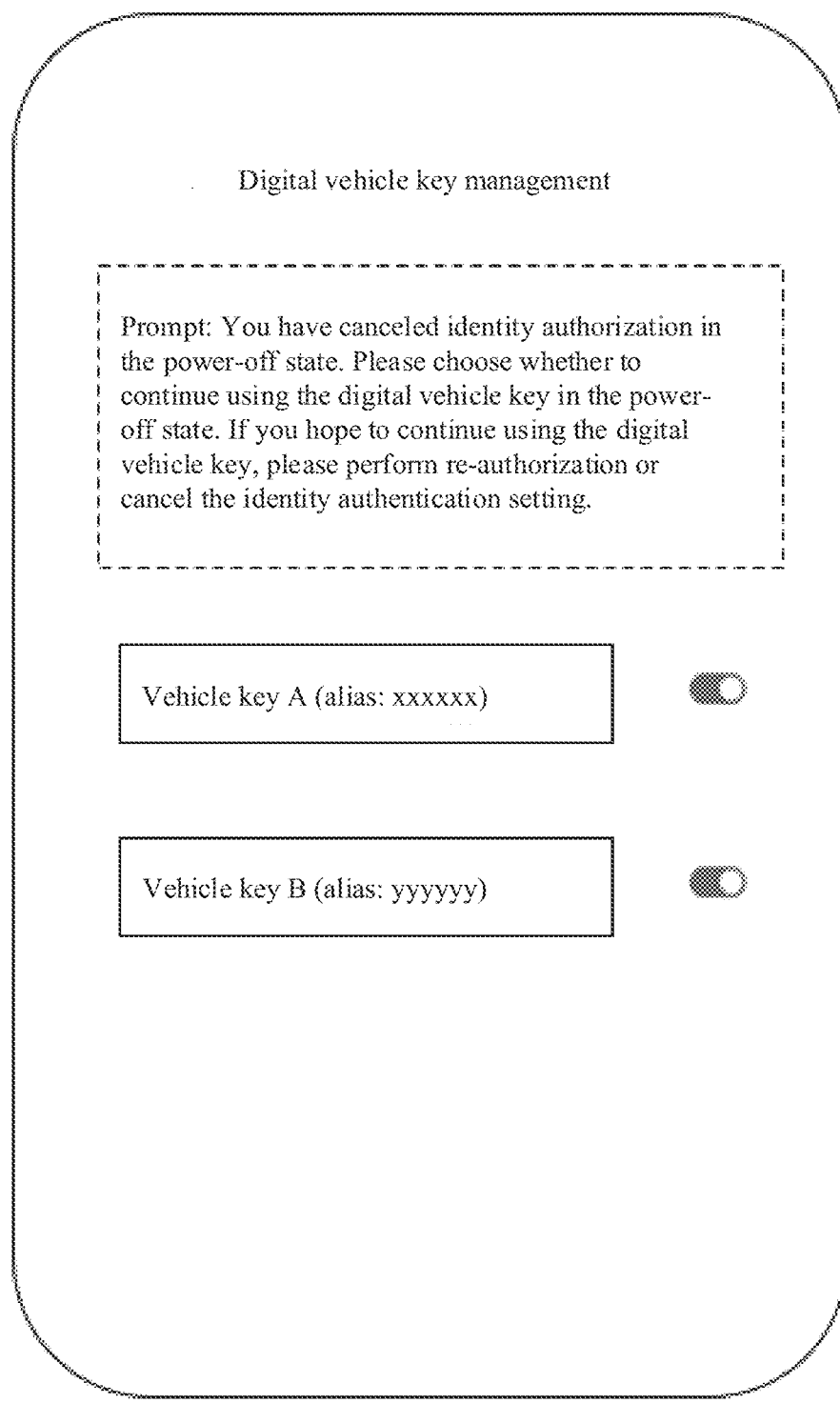
FIG. 6 is a schematic diagram of another user interface when a user cancels authorization in an example of an application scenario in which a digital key is used as a vehicle key.

Optionally, in another implementation, if the user cancels authorization, a configuration interface of mandatory identity authentication may further be jumped to, so that the user may re-configure mandatory identity authentication, and change an original configuration. For example, FIG. 6 is a schematic diagram of another user interface when a user cancels authorization in an example of an application scenario in which a digital key is used as a vehicle key. In the user interface in FIG. 6, prompt text in an upper area is used to notify the user that authorization has been canceled, and notify the user of another operation that the user can take if the user wishes to use the vehicle key in a power-off state. Text and images in a lower area are used to indicate the user to re-configure mandatory identity authentication for the digital vehicle key.

It should be noted that, when the foregoing passive identity authentication means is used to perform identity authentication on the user, the second terminal may not display the foregoing user interfaces, but execute the entire identity authentication procedure in the background.

S102: Store, in the secure element, the user identity authentication information including the user identity authentication result.

After the identity authentication result is generated, the user identity authentication information including the user identity authentication result may be stored in the secure element, so as to be invoked subsequently when the digital key is used. In the embodiments of this application, an existing secure element may be used, for example, an embedded secure element (embedded SE, eSE), an inSE secure module integrated into a main chip (System on Chip, SoC) of a mobile phone, and a universal integrated circuit card secure element (Universal Integrated Circuit Card Secure Element, UICC SE).

Optionally, in a first implementation, the digital key service may obtain the user identity authentication result, and directly store the user identity authentication result in the secure element as the user identity authentication information.

Optionally, in a second implementation, the digital key service may obtain the user identity authentication result, and then process the user identity authentication result by using a second key pre-agreed with the first terminal, to generate second verification data, so as to ensure that the user identity authentication information has verifiable and non-repudiation characteristics. In this way, after receiving the user identity authentication information, the first terminal may verify the user identity authentication information by using the pre-agreed second key, to ensure that the user identity authentication information is not tampered with in a transmission process and that a source for sending the user identity authentication information is authorized. Finally, the second verification data and the user identity authentication result are used together as the user identity authentication information, and are stored in the secure element together. In this case, the user identity authentication information is sometimes referred to as an identity authentication attestation (Attestation).

It should be noted that, in actual application, the second verification data may be a digital signature, a message authentication code (Message Authentication Code, MAC), a hashed message authentication code (Hashed Message Authentication Code, HMAC), or the like. When the user identity authentication result is processed by using the second key, the user identity authentication result may be directly processed by using the second key to obtain the second verification data; or the user identity authentication result may be first compressed into a message digest, and then the message digest is processed by using the second key to obtain the second verification data.

Optionally, in a third implementation, the digital key service may obtain the user identity authentication result and a first timestamp, and then store the user identity authentication result and the first timestamp in the secure element together as the user identity authentication information.

The first timestamp in the embodiments of this application is used to indicate a time of generating the user identity authentication result. In actual application, a time at which the user identity authentication system generates the user identity authentication result may be used as the first time stamp, a time at which the digital key service obtains the user identity authentication result may be used as the first time stamp, or another approximate time may be used as the first time stamp. These times are in a very short time period before the second terminal enters the preset operating state, and may also be understood as being in a relatively short time period from the switching procedure to a time at which the user identity authentication information is stored in the secure element. Therefore, regardless of which time is used as the first time stamp, the time of generating the user identity authentication result may be indicated. The first timestamp may be obtained by the digital key service from outside, for example, generated by the identity authentication system; or may be generated by the digital key service itself. This is not limited in this application. In an implementation, the digital key service may obtain the first timestamp from an identity authentication system or a trusted time service in a trusted execution environment TEE of a mobile phone, or may obtain the first timestamp from a trusted time server, to ensure credibility of the source of the first timestamp. In addition, the first timestamp may carry a tamper-proof attribute (for example, a digital signature). This is not limited in this application.

Optionally, in a fourth implementation, the digital key service may obtain the user identity authentication result and the first timestamp, and then process the user identity authentication result and the first timestamp by using the second key pre-agreed with the first terminal, to generate second verification data, so as to ensure that the user identity authentication information has verifiable and non-repudiation characteristics. Finally, the second verification data, the user identity authentication result, and the first timestamp are used together as the user identity authentication information, and are stored in the secure element together. In this case, the user identity authentication information may also be referred to as an identity authentication attestation.

For the second verification data in this implementation, refer to the related description in the second implementation. For the first time stamp, refer to the related description in the third implementation. Details are not described herein again.

Optionally, in an implementation of storing the user identity authentication information in the secure element, the user identity authentication information may be written to the digital key applet in the secure element.

For example, the digital key service may set a specific indication field in the digital key applet, and use different values of the indication field to indicate three states of the user identity authentication result, so as to write the user identity authentication result to the digital key applet. For example, the digital key applet may indicate an identity authentication result in a tag (tag) when coding is performed in a conventional tag-length-value (Type-Length-Value, TLV) format, the value "1" may indicate that the user identity authentication result is a success, the value "2" may indicate that the user identity authentication result is a failure, and the value "3" may indicate that the user identity authentication result is not completed. Such information is referred to as first information in this application, that is, the first information is a representation form in which the digital key applet presents a user identity authentication result. Therefore, the foregoing user identity authentication information includes the user identity authentication result, and it may also be considered that the user identity authentication information includes the first information. The first information is used to indicate whether the identity authentication result is a success or a failure, or indicate that the identity authentication system has not completed identity authentication before the second terminal enters the preset operating state.

For another example, the digital key service may set another particular indication field in the digital key applet, and use a particular value of the indication field to indicate whether the second terminal is about to enter the preset operating state when the user identity authentication information is written to the secure element. That is, the indication field is used to indicate whether the second terminal is in the preset operating state when responding to a service instruction of the first terminal. For example, during external presentation, "1" may indicate that the second terminal is in the preset operating state when sending a service response message to the first terminal, and "0" may indicate that the second terminal is in another operating state, for example, a non-preset operating state, when responding to the service instruction of the first terminal. Such information is referred to as second information in this application. Therefore, in addition to the first information, the user identity authentication information may further include the second information. The second information is used to indicate whether the second terminal is in the preset operating state when sending the service response message to the first terminal.

Optionally, the foregoing second information may alternatively be provided by an NFC controller (NFC Controller) for the digital key applet.

It should be noted that the foregoing first information and the foregoing second information may be independently represented by two indication fields, or may be combined together and represented by a same indication field. This is not limited in this application. For example, when a same particular indication field is used for representation, the three states indicated by the first information and the two states that can be indicated by the second information may be combined, so that six cases are separately represented by using six different values of the particular indication field. For example, when the user identity authentication information written to the security element further includes a first time stamp, the second verification data, and the like, the digital key service may set a particular indication field to indicate existence of data. Then, the first time stamp, the second verification data, and the like are stored in a preset storage address, so that other information in addition to the first information and the second information can also be stored in the secure element.

By using the first information, the second information, and the other information, a state of whether identity authentication is completed before the second terminal enters the preset operating state, an operating state of the second terminal when the second terminal sends the service response message to the first terminal, the first time stamp, verification information, and the like may be stored in the digital key applet, and are delivered to the first terminal when the digital key is used. In this way, the first terminal may learn of a status of the second terminal by using the information, and further perform risk control according to a preset security policy. A specific method for performing risk control is described in detail in a subsequent step performed by the first terminal.

Optionally, in another implementation of storing the user identity authentication information in the secure element, the user identity authentication information may be written to a broker applet (Broker Applet) in the secure element.

Figure 7:
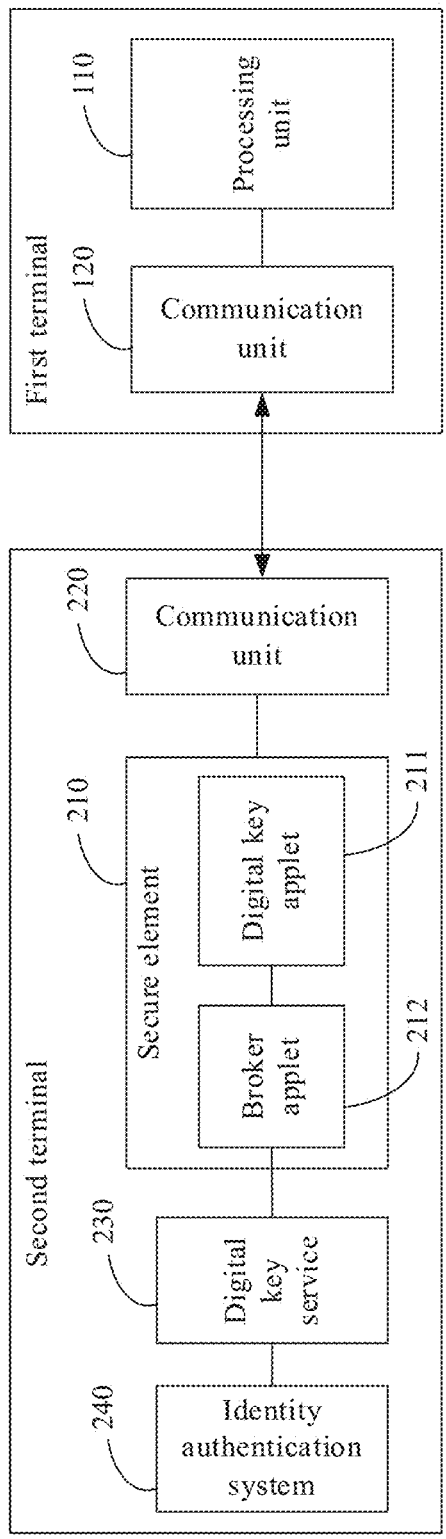
FIG. 7 is another schematic diagram of an application scenario of a method for authenticating an identity of a digital key according to an embodiment of this application.

The security element used in the embodiments of this application supports a Broker interface (Amendment J) specification of an International Platform Organization (Global Platform, GP). FIG. 7 is another schematic diagram of an application scenario of a method for authenticating an identity of a digital key according to an embodiment of this application. There is one broker applet 212 in the secure element 210 of the second terminal, and the broker applet 212 can centrally provide the user identity authentication information for all applets in the secure element 210 (including the digital key applet 211 and another applet that may exist). Therefore, the digital key service 230 may transmit any piece of the foregoing user identity authentication information to the broker applet 212 for storage. The user identity authentication result in the user identity authentication information is generated by an identity authentication system 240. When the digital key applet 211 in the second terminal interacts with the first terminal, if the user identity authentication information needs to be provided, the digital key applet 211 obtains the stored user identity authentication information from the proxy applet 212 through a standard interface.

It should be noted that, when user identity authentication is performed, if previous one or several times of authentication fail, identity authentication may be performed on the user again once or a plurality of times to avoid a case in which the user inputs an incorrect password or no valid biometric feature is collected. In this case, the last identity authentication result may be stored in the secure element. For example, when switching from a normal battery mode to a power-off state, the second terminal triggers the identity authentication system to perform identity authentication on the user. First, the user interface shown in FIG. 4 is displayed on the display screen of the second terminal to guide the user to input a fingerprint. The user prints in a printing area and records a fingerprint. Because there is water on a finger of the user, a similarity between a fingerprint image collected by the identity authentication system during first printing and a fingerprint image pre-stored in the second terminal is lower than a preset threshold, the identity authentication system determines that the fingerprint image recorded in the first time does not match the pre-stored fingerprint image, that is, identity authentication fails. In this case, the second terminal does not store the result of "fail" in the secure element, but prompts the user that identity authentication fails, and requests the user to record a fingerprint image again. The user wipes off the water from the finger and reprints the fingerprint. If a similarity between a recorded fingerprint image and the pre-stored fingerprint image is higher than the preset threshold, the identity authentication succeeds, and the second terminal stores the recently obtained result of "succeed" in the secure element. If a quantity of times for which the user repeatedly records a fingerprint image exceeds a preset quantity of times and all results are failures, the second terminal stores the recently obtained result "fail" in the secure element.

When identity authentication is performed on the user and the user identity authentication information is stored, an original switching procedure in the second terminal may be suspended. After storage of the identity authentication information is completed, the switching procedure continues to be performed. After the switching procedure is completed, the second terminal officially enters the preset operating state.

Phase 2: The User Uses the Digital Key when the Second Terminal is in the Preset Operating State Refer to FIG. 3. In phase 2, the second terminal may perform steps S103 and S104.

S103: The second terminal receives a service instruction from the first terminal.

The second terminal exchanges information with the first terminal by using a communication unit. In addition, the communication unit needs to include a communication module to which power can be supplied independently, for example, an NFC module. In this way, when the second terminal is in the preset operating state, for example, in the power-off or low battery mode, the communication module to which power is supplied independently is not affected by the operating state of the main chip of the second terminal, and may still exchange information with the first terminal.

S104: In response to the service instruction, the second terminal in the preset operating state sends the service response message processed by using the first key to the first terminal.

The preset operating state in this application may be a state in which the identity authentication system of the second terminal cannot generate an identity authentication result. In the preset operating state, the second terminal adds the user identity authentication information stored in the secure element in phase 1 to the service response message, and processes the service response message by using the first key. The first key is a key pre-agreed on by the second terminal and the first terminal, and the first key is different from the foregoing second key used to generate the second verification data. The first key in the second terminal may be stored in the digital key applet in the secure element. Then, the second terminal sends the processed service response message to the first terminal.

The service response message in this embodiment includes the user identity authentication information. The user identity authentication information may include only the user identity authentication result, may include the user identity authentication result and the second verification data, may include the user identity authentication result and the first timestamp, or may include the user identity authentication result, the first timestamp, and the second verification data. For the user identity authentication information, the user identity authentication result, the first timestamp, and the second verification data, refer to the related descriptions in phase 1, and details are not described herein again. In addition, the service response message may further include other information, for example, the foregoing second information, protocol information, transaction/service identification information, identification information of the first terminal, and a random information value generated by the first terminal/second terminal. This is not limited in this application.

Optionally, the service response message may further include first verification data. The first verification data in this application is verification data generated by processing the user identity authentication information in the service response message or by processing the user identity authentication information and other information in the service response message by using the first key. When the service response message includes the first verification data, it may be considered that the service response message is a service response message processed by using the first key. Similar to the second verification data, when the user identity authentication information or the user identity authentication information and the other information are processed by using the first key, the information may be directly processed by using the first key to obtain the first verification data; or the information may be first compressed into a message digest, and then the message digest is processed by using the first key to obtain the first verification data.

It should be noted that an encryption mechanism for the first key in this application may use existing symmetric encryption or asymmetric encryption, or generate a session key after key negotiation is performed based on asymmetric encryption. Details are not described herein.

It should be further noted that, when a service instruction is different, a service operation corresponding to the service instruction is also correspondingly different, and information required for determining whether the first terminal authorizes the service operation is also different. Therefore, in an implementation, information included in the service response message may be different according to different service instructions.

Optionally, before responding to the service instruction, the second terminal may first determine whether the service instruction sent by the first terminal requires the second terminal to provide the user identity authentication information, that is, determine whether the user identity authentication information is required when the service operation corresponding to the service instruction is authorized. If the user identity authentication information is required, the user identity authentication information in the secure element is added to the service response message; or if the user identity authentication information is not required, the user identity authentication information does not need to be provided to the first terminal.

Corresponding to S103, the first terminal sends the service instruction to the second terminal. Corresponding to S104, the first terminal receives the service response message sent by the second terminal in response to the service instruction.

Refer to FIG. 3. In phase 2, the first terminal may perform steps S105 and S106.

S105: The first terminal obtains the user identity authentication information after verifying the service response message by using the first key.

The first key is a key pre-agreed on by the second terminal and the first terminal. If the verification performed by the first terminal on the service response message by using the first key fails, it indicates that the second terminal does not have a digital key recognized by the first terminal. If the verification performed by the first terminal on the service response message by using the first key succeeds, it indicates that the second terminal holds a digital key recognized by the first terminal, that is, the digital key in the second terminal is authorized. In this case, the first terminal may further verify the user identity authentication information included in the service response message.

An example in which the service response message includes the user identity authentication information, the other information, and the first verification data is used below to further describe an implementation of verification. The first terminal processes the user identity authentication information and the other information by using the first key to obtain first check data. Then, the first check data is compared with the first verification data. If the first check data is the same as the first verification data, the verification succeeds; or if the first check data is different from the first verification data, the verification fails.

When the service response message does not include the second verification data, the first terminal may directly determine, by using content in the user identity authentication information and a preset security policy, whether to authorize the service operation corresponding to the service instruction. When the service response message includes the second verification data, the first terminal needs to verify, by using the second key pre-agreed with the second terminal, whether the user identity authentication information is valid, to ensure that the user identity authentication information is generated by the digital key service or the identity authentication system of the second terminal. In addition, the first terminal further needs to determine whether the content in the user identity authentication information conforms to the preset security policy. The service operation corresponding to the service instruction can be authorized only when the two conditions are satisfied.

An example in which the user identity authentication information includes the user identity authentication result and the first timestamp, and the service response message includes the second verification data is used to further describe the process of verifying whether the user identity authentication information is valid. The first terminal processes the user identity authentication information, that is, the user identity authentication result and the first timestamp by using the second key, to obtain second check data through calculation. Then, the second check data is compared with the second verification data. If the second check data is the same as the second verification data, it is determined that the user identity authentication information is valid; or if the second check data is different from the second verification data, it is determined that the user identity authentication information is invalid. By using this method, it can be ensured that the user identity authentication information has not been tampered with in a transmission process, that is, integrity of the user identity authentication information can be ensured. In addition, it can be ensured that a source for sending the user identity authentication information is authorized, that is, an authorized holder of the key in the second terminal is ensured, to ensure that the user identity authentication information has verifiable and non-repudiation characteristics.

It should be noted that the service response message originally includes the user identity authentication information, and even if the first key is not used for verification, the first terminal can still obtain the user identity authentication information from the service response message. However, as described above, if the verification performed by using the first key fails, it indicates that the second terminal does not hold a digital key recognized by the first terminal. In this case, a subsequent step does not need to be performed by using the user identity authentication information, and authorization on the service operation is directly refused. However, if the verification performed by using the first key succeeds, it indicates that the digital key in the second terminal is authorized. In this case, the subsequent step is performed by using the user identity authentication information in the service response message, to add verification on the identity of the user, thereby improving security of the digital key.

It should be further noted that if the service instruction sent by the first terminal does not require verification on the user identity authentication information, that is, if the user identity authentication information is not required when whether to authorize the service operation corresponding to the service instruction is determined, the subsequent step does not need to be performed by using the user identity authentication information. In an implementation, in this case, whether to authorize the service operation corresponding to the service instruction may be directly determined based on a verification result of the first key.

S106: Verify the user identity authentication information.

The first terminal stores a preset security policy, and the security policy includes one or more rules related to the user identity authentication information. In an implementation of verifying the user identity authentication information, the first terminal may compare the user identity authentication information with the rule in the security policy; and determine, based on whether the user identity authentication information satisfies the rule in the security policy, whether the service operation corresponding to the service instruction can be authorized.

It should be noted that security policies of different first terminals may be different, and security policies of the first terminal may also be different in different application scenarios. A manufacturer of the first terminal, for example, a vehicle manufacturer, may preset a security policy based on a risk tolerance capability of the manufacturer.

It should be further noted that the user identity authentication information herein is obtained from the security element in the second terminal. When the user identity authentication information is obtained, the second terminal is in the preset operating state. The user identity authentication information includes the user identity authentication result, and the user identity authentication result is generated by the identity authentication system of the second terminal before the second terminal enters the preset operating state.

Optionally, the user identity authentication information may include the foregoing second information. The first terminal can clearly learn, by using the second information, whether the second terminal is in the preset operating state when the second terminal sends the service response message to the first terminal. In an implementation, the second information is used to indicate whether the second terminal is in the preset operating state when sending the service response message. Therefore, if the user identity authentication information includes the second information, the first terminal may determine, by using the second information, a state of the second terminal when the second terminal sends the service response message. When the second terminal is in the preset operating state, the identity authentication system of the second terminal cannot be used normally. In this case, the obtained user identity authentication result is generated and stored before the second terminal enters the preset operating state, and is not generated in real time. This indicates that a risk is relatively high when the current user uses the digital key. In this case, the first terminal may perform risk control according to the preset security policy and the user identity authentication information, and determine whether to authorize the service operation, thereby reducing the risk.

Optionally, the user identity authentication information may include the foregoing first information. The first terminal may clearly learn, by using the first information, whether identity authentication is performed or whether identity authentication is not completed before the second terminal enters the preset operating state. In an implementation, the first information is used to indicate that the identity authentication result is "succeed". "fail", or "not completed". The security policy includes a first rule, and the authentication result is preset as "succeed" in the first rule. If the identity authentication result in the service response message is also "succeed", the identity authentication result in the service response message matches the preset authentication result; or if the identity authentication result in the service response message is "fail" or "not completed", the identity authentication result in the service response message does not match the preset authentication result.

The service instruction may include one or more different instructions. When the service instruction includes a plurality of different instructions, the plurality of different instructions may be sent to the second terminal separately, or may be sent to the second terminal together. This is not limited in this application. When the plurality of different instructions are sent to the second terminal separately, the second terminal may perform separate response, and send corresponding service response messages to the first terminal separately; or may perform response once, and send one service response message to the first terminal. It should be noted that when the first terminal sends the plurality of different instructions to the second terminal separately and the second terminal performs separate response, the second terminal may first respond to an instruction sent first, and then receive an instruction sent later; or may first receive an instruction sent later, and then respond to a plurality of received instructions one by one. In other words, a sequence of steps of receiving the plurality of instructions and responding to the plurality of instructions by the second terminal is not limited in this application. When the plurality of different instructions are sent to the second terminal together, the second terminal may respond once, and send one service response message to the first terminal; or may perform separate response. This is not limited in this application.

The service operation corresponding to the service instruction may include one or more operations. This is not limited in this application. The first terminal and the second terminal may agree on service instructions in a plurality of different scenarios, and each service instruction in a different scenario may include one or more service operation requests. The first terminal determines whether to authorize one or more service operations based on requests for the one or more service operations included in a scenario of a service instruction currently sent by the first terminal to the second terminal.

For example, in an application scenario in which the digital key is used as a vehicle key, the first terminal may be a vehicle, and the second terminal may be a mobile phone. There is a plurality of communication units in the vehicle, and different service instructions and corresponding service operations may be distinguished between each other by using different communication units. When a communication module associated with a vehicle door sends a service instruction, a corresponding service operation may be unlocking a single vehicle door or all vehicle doors. When a communication module associated with a trunk of the vehicle sends a service instruction, a corresponding service operation may be unlocking the trunk. When a communication module associated with a start module located inside the vehicle sends a service instruction, a corresponding service operation may be starting the engine. In this way, when receiving a service response message sent by the mobile phone, the vehicle may determine, based on different service instructions and by using different security policies, whether to authorize a corresponding service operation.

The following uses 12 different security policies as an example to further describe a process of determining, based on the user identity authentication information, whether to authorize a service operation corresponding to a service instruction when different security policies are used.

(1) Security Policy 1

The security policy 1 includes a first rule.

The first rule is a rule related to a user identity authentication result, and includes two sub-rules. An authentication result is preset as "succeed" in the first rule. Sub-rule a: If a user identity authentication result in a service response message is also "succeed", the user identity authentication result in the service response message matches the preset authentication result. Sub-rule b: If an identity authentication result in a service response message is "fail" or "not completed", the identity authentication result in the service response message does not match the preset authentication result.

When the security policy 1 is used, the first terminal needs to determine whether the user identity authentication result conforms to the sub-rule a in the first rule. If the user identity authentication result conforms to the sub-rule a in the first rule, the first terminal directly authorizes the service operation corresponding to the service instruction. If the user identity authentication result does not conform to the sub-rule a in the first rule, the first terminal refuses to authorize the service operation corresponding to the service instruction.

For example, in an application scenario in which the digital key is used as a vehicle key, the first terminal is a vehicle, the second terminal is a mobile phone, and the service operation corresponding to the service instruction includes "unlocking" or "starting the engine". The mobile phone is currently in a power-off state. After the vehicle successfully verifies a service response message sent by the mobile phone, if the user identity authentication result in the user identity authentication information is "succeed", the user identity authentication result conforms to the sub-rule a, and the service operation "unlocking" or "starting the engine" is authorized.

(2) Security Policy 2

The security policy 2 includes a first rule and a second rule. The first rule is the same as the first rule in the security policy 1, and details are not described herein again.

The second rule is a rule related to a total quantity of times for which the first terminal authorizes the service operation when the second terminal is in the preset operating state. The first terminal records a historical total quantity of times of authorizing the service operation when the second terminal is in the preset operating state. A quantity threshold is preset in the second rule, requiring that the total quantity of times of authorization be within the quantity threshold.

When the security policy 2 is used, the first terminal needs to determine whether the user identity authentication result conforms to the sub-rule a in the first rule and whether the total quantity of times of authorization conforms to the second rule. If the two rules are both conformed to, the first terminal authorizes the service operation corresponding to the service instruction. If either of the two rules is not conformed to, the first terminal refuses to authorize the service operation corresponding to the service instruction.

In addition, regardless of whether to authorize the service operation, the first terminal or the second terminal may display prompt information to the user to notify the user of the current total quantity of times of authorization, a consequence in the future, a measure that can be taken by the user, and the like.

For example, in an application scenario in which the digital key is used as a vehicle key, the first terminal is a vehicle, the second terminal is a mobile phone, and the service operation corresponding to the service instruction includes "starting the engine". The quantity threshold that is set in the second rule is 4. After the vehicle successfully verifies a service response message sent by the mobile phone, if the user identity authentication result in the user identity authentication information is "succeed", the user identity authentication result conforms to the sub-rule a. If the digital key has been used when the mobile phone is in the power-off or low battery mode, the vehicle has performed authorization four times, and the current authorization is the fifth time, the second rule is not conformed to. Therefore, the vehicle refuses to authorize the service operation "starting the engine".

In addition, a time period may further be preset in the second rule, requiring that the total quantity of times of authorization within a period of time be within the threshold. For example, the second rule may require that the total quantity of times of authorization within 24 hours from the current time be within the quantity threshold.

In this manner, the first terminal may restrict a case of using the digital key in the preset operating state, a risk of maliciously using the digital key in the second terminal that is in the preset operating state and that lacks real-time protection is further reduced.

(3) Security Policy 3

The security policy 3 includes a first rule and a third rule. The first rule is the same as the first rule in the security policy 1, and details are not described herein again.

The third rule is a rule related to frequency at which the first terminal authorizes the service operation when the second terminal is in the preset operating state. The frequency of authorization may be determined by using a quantity of times of authorization performed within a period of time. The first terminal records a historical quantity of times of authorizing the service operation when the second terminal is in the preset operating state and a time corresponding to each time of authorization. A frequency threshold is preset in the third rule, requiring that the frequency of authorization (that is, a quantity of times of authorization within a period of time) be within the frequency threshold.

When the security policy 3 is used, the first terminal needs to determine whether the user identity authentication result conforms to the sub-rule a in the first rule and whether the frequency of authorization conforms to the third rule. If the two rules are both conformed to, the first terminal authorizes the service operation corresponding to the service instruction. If either of the two rules is not conformed to, the first terminal refuses to authorize the service operation corresponding to the service instruction.

For example, in an application scenario in which the digital key is used as a vehicle key, the first terminal is a vehicle, the second terminal is a mobile phone, and the service operation corresponding to the service instruction includes "starting the engine". It is set in the third rule that the frequency threshold of authorization is 10 times per month. After the vehicle successfully verifies a service response message sent by the mobile phone, if the user identity authentication result in the user identity authentication information is "succeed", the user identity authentication result conforms to the sub-rule a. If the digital key has been used when the mobile phone is in the power-off or low battery mode, the vehicle has performed authorization five times within one month, and the current authorization is the sixth time, the third rule is conformed to. Therefore, the vehicle authorizes the service operation "starting the engine".

In this manner, the first terminal may restrict a case of using the digital key in the preset operating state, a risk of maliciously using the digital key in the second terminal that is in the preset operating state and that lacks real-time protection is further reduced.

(4) Security Policy 4

The security policy 4 includes a first rule and a fourth rule. The first rule is the same as the first rule in the security policy 1, and details are not described herein again.

The fourth rule is a rule related to interval duration between a time of using the digital key and a time of generating the user identity authentication result. The user identity authentication information obtained by the first terminal further includes the first timestamp, and the first timestamp is used to indicate the time of generating the identity authentication result in the second terminal. A duration threshold is preset in the fourth rule, requiring that the interval duration between the current time and the first timestamp be within the preset duration threshold.

When the security policy 4 is used, the first terminal needs to determine whether the user identity authentication result conforms to the sub-rule a in the first rule and whether the first timestamp conforms to the fourth rule. If the two rules are both conformed to, the first terminal authorizes the service operation corresponding to the service instruction. If either of the two rules is not conformed to, the first terminal refuses to authorize the service operation corresponding to the service instruction.

It should be noted that the current time in the fourth rule may be a real time at which the first terminal determines whether the first time stamp conforms to the fourth rule, may be a time at which the first terminal receives the service response message, a time at which the first terminal obtains the user identity authentication information, or the like. These times are relatively close, and the interval duration between the time of using the digital key by the user and the time of generating the user identity authentication result can be indicated regardless of which time is used as the current time. Therefore, a specific time used as the current time is not limited in this application.

For example, in an application scenario in which the digital key is used as a vehicle key, the first terminal is a vehicle, the second terminal is a mobile phone, and the service operation corresponding to the service instruction includes "starting the engine". The interval duration is set to 24 hours in the fourth rule. After the vehicle successfully verifies a service response message sent by the mobile phone, if the user identity authentication result in the user identity authentication information is "succeed", the user identity authentication result conforms to the sub-rule a. If the first timestamp is 20:00 on March 5 and the current time is 12:00 on March 6, interval duration between the two times is 16 hours, which is less than the duration threshold 24 hours. In this case, the fourth rule is conformed to. Therefore, the vehicle authorizes the service operation "starting the engine".

(5) Security Policy 5

The security policy 5 includes a first rule and a fifth rule. The first rule is the same as the first rule in the security policy 1, and details are not described herein again.

The fifth rule is a rule related to whether the second terminal switches back to the non-preset operating state after entering the preset operating state. In an implementation of the fifth rule, the first timestamp needs to be compared with a second timestamp. It is required that the second timestamp be earlier than the first timestamp, that is, it is required that the second terminal does not switch from the preset operating state back to the non-preset operating state after the time indicated by the first timestamp. The user identity authentication information further includes the first timestamp, and the first timestamp is used to indicate the time of generating the identity authentication result in the second terminal. The second timestamp is used to indicate a time at which the second terminal most recently switches from the preset operating state to the non-preset operating state. In other words, the second timestamp is used to indicate a time, within a time period in which the second terminal switches from the preset operating state to the non-preset operating state, closest to a time at which the second terminal sends the service response message.

In another implementation of the fifth rule, the first timestamp needs to be compared with a third timestamp. It is required that an interval between the third timestamp and the first timestamp be less than a preset threshold. The first timestamp is used to indicate the time of generating the identity authentication result in the second terminal. At this time, the second terminal is about to enter the preset operating state. The third timestamp is used to indicate a time at which the second terminal most recently switches from the non-preset operating state to the preset operating state. In other words, in this implementation, the fifth rule requires that the third timestamp be very close to the first timestamp rather than far later than the first timestamp.

If the first timestamp does not conform to the fifth rule, it indicates that the second terminal has entered the non-preset operating state after the first timestamp. The identity authentication system of the second terminal currently can work normally, or the second terminal can provide more new identity authentication information, and the currently provided identity authentication information cannot represent a newest user authentication status. Regardless of which case, it proves that the second terminal has had abnormal behavior in the current service, to be specific, provided information that should not be provided in a normal situation. It indicates that there may be a security risk if the digital key is used currently. For example, the second terminal replays outdated identity authentication information to attempt to authorize a current service operation. However, if the second terminal is not restarted after a power-off time, it indicates that a risk of abusing the identity authentication information replay is relatively low. Therefore, the fifth rule may be combined with the foregoing first rule to further reduce the security risk of using the digital key.

It should be noted that when the fifth rule is used, the determining step may be performed locally on the first terminal; or may be sent by the first terminal to a server, and the server performs online verification.

In an implementation, the second timestamp may be obtained by the first terminal from the server. The first terminal first receives the second timestamp sent by the server; and then determines, based on whether the second timestamp is later than the first timestamp, whether the second terminal switches from the preset operating state to the non-preset operating state after the time indicated by the first timestamp.

In another implementation, the first terminal may send an online verification request including the first timestamp to the server. Then, the server determines, based on the fifth rule stored in the server, the first timestamp, and the second timestamp, whether the second terminal switches from the preset operating state to the non-preset operating state after the time indicated by the first timestamp, to obtain an online verification result. Subsequently, the server sends the online verification result to the first terminal. If the online verification result is a success, the first terminal may determine the second terminal does not switch from the preset operating state to the non-preset operating state after the time indicated by the first timestamp; or if the online verification result is a failure, the first terminal may determine that the second terminal switches from the preset operating state to the non-preset operating state after the time indicated by the first timestamp.

The foregoing server may be a server directly or indirectly communicatively connected to the second terminal. For example, in an application scenario in which the digital key is used as a vehicle key, the second terminal is a mobile phone, the foregoing server may be a server of a vehicle manufacturer and is communicatively connected to a mobile phone account server, and the mobile phone account server is communicatively connected to the mobile phone. In this case, the mobile phone is indirectly connected to the server of the vehicle manufacturer. Because once being powered on, the mobile phone automatically connects to the mobile phone account server, the server of the vehicle manufacturer may obtain a power-on time of the mobile phone by using the mobile phone account server.

When the security policy 5 is used, the first terminal needs to determine whether the user identity authentication result conforms to the sub-rule a in the first rule and whether the first timestamp conforms to the fifth rule. If the two rules are both conformed to, the first terminal authorizes the service operation corresponding to the service instruction. If either of the two rules is not conformed to, the first terminal refuses to authorize the service operation corresponding to the service instruction. In addition, if the first timestamp does not conform to the fifth rule, the first terminal may alternatively freeze the digital key, indicate the second terminal to freeze the digital key, or indicate the user to perform identity authentication again, thereby improving security of using the digital key.

For example, in an application scenario in which the digital key is used as a vehicle key, the first terminal is a vehicle, the second terminal is a mobile phone, and the service operation corresponding to the service instruction includes "starting the engine". The foregoing security policy 5 is used.

After the vehicle successfully verifies a service response message sent by the mobile phone, it may be determined that the user identity authentication result conforms to the sub-rule a in the first rule. If the user identity authentication result in the user identity authentication information is "succeed", the user identity authentication result conforms to the sub-rule a. The vehicle obtains the second timestamp, and determines whether the first timestamp and the second timestamp conform to the fifth rule. It is assumed that the first timestamp is 20:00 on March 5, and the second timestamp is 10:00 on March 5 (the latest power-on time). In this case, the second timestamp is earlier than the first timestamp, and it indicates that the mobile phone is not powered on again after 20:00 on March 5. Therefore, the fifth rule is conformed to. Therefore, the vehicle authorizes the service operation "starting the engine".

It should be understood that the fifth rule may also be applied to any one of the foregoing security policies 1 to 4 and subsequent security policies 6 to 8. That is, the security policies 1 to 4 and the security policies 6 to 8 each may be combined with the foregoing fifth rule. After the service operation is authorized, it may further be determined whether the second terminal reenters the non-preset operating state from the preset operating state after the time indicated by the first timestamp. If the second terminal reenters the non-preset operating state, the fifth rule is not conformed to. It indicates that although the second terminal has provided a user identity verification result meeting a requirement, the first terminal subsequently determines, according to the fifth rule, that the user identity authentication result is not the newest. Therefore, a security risk exists currently. In this case, the first terminal may freeze the digital key, indicate the second terminal to freeze the digital key, or indicate the user to perform identity authentication again. By increasing the determining about the fifth rule, the risk of the digital key is further reduced and the security of using the digital key is improved.

It should be noted that the foregoing security policies 1 to 5 may further be combined with each other, and different security policies are used to correspond to different service operations. For ease of understanding, an application scenario in which the digital key is used as a vehicle key is used as an example below for a further description. In a use procedure, the security policy 1 is used for a door opening operation of a vehicle, and any one of the security policies 2 to 5 is used when the engine is started. When using NFC as a communication technology, the user first places a phone close to an NFC reader in a handlebar of the vehicle. The NFC card reader of the vehicle sends a service instruction, performs determining based on a condition of the security policy 1 after receiving a service response sent by the mobile phone, and unlocks a door lock in the door if verification succeeds. Subsequently, the user enters the vehicle, and places the mobile phone in a card reading area in the vehicle. The vehicle sends another service instruction, performs verification based on any one of the security policies 2 to 5 after receiving a service response sent by the mobile phone, and allows the user to start the engine if the verification succeeds.

(6) Security Policies 6 to 8

The security policy 6 includes a first rule and a second rule. The security policy 7 includes a first rule and a third rule. The security policy 8 includes a first rule and a fourth rule. The first rule is the same as that in the foregoing security policy 1, the second rule is the same as that in the foregoing security policy 2, the third rule is the same as that in the foregoing security policy 3, and the fourth rule is the same as that in the foregoing security policy 4. Details are not described herein again.

As described above, the service instruction sent by the first terminal to the second terminal may include a plurality of instructions, and the instructions respectively correspond to a plurality of different service operations. For example, the service instruction may include a first instruction and a second instruction; and correspondingly, the service operation includes a first operation corresponding to the first instruction and a second operation corresponding to the second instruction. To improve user experience, in different application scenarios, different operations may correspond to different rules based on different risks of the operations. When the user identity authentication information satisfies different rules in the security policy, the first terminal authorizes different service operations.

When the security policy 6 is used, the first terminal needs to sequentially determine whether the user identity authentication result conforms to the sub-rule a in the first rule and whether the total quantity of times of authorization conforms to the second rule. If the user identity authentication result conforms to the sub-rule a in the first rule, the first terminal authorizes the first operation; or if the user identity authentication result does not conform to the sub-rule a in the first rule, the first terminal refuses to authorize the first operation. After the first operation is authorized, if the total quantity of times of authorization conforms to the second rule, the first terminal authorizes the second operation; or if the total quantity of times of authorization does not conform to the second rule, the first terminal refuses to authorize the second operation.

Similar to the case of using the security policy 7, when the security policy 7 is used, the first terminal needs to sequentially determine whether the user identity authentication result conforms to the sub-rule a in the first rule and whether the frequency of authorization conforms to the third rule. If the user identity authentication result conforms to the sub-rule a in the first rule, the first terminal authorizes the first operation; or if the user identity authentication result does not conform to the sub-rule a in the first rule, the first terminal refuses to authorize the first operation. After the first operation is authorized, if the frequency of authorization conforms to the third rule, the first terminal authorizes the second operation; or if the frequency of authorization does not conform to the third rule, the first terminal refuses to authorize the second operation.

Similar to the case of using the security policy 6 or 7, when the security policy 7 is used, the first terminal needs to sequentially determine whether the user identity authentication result conforms to the sub-rule a in the first rule and whether the first timestamp conforms to the fourth rule. If the user identity authentication result conforms to the sub-rule a in the first rule, the first terminal authorizes the first operation; or if the user identity authentication result does not conform to the sub-rule a in the first rule, the first terminal refuses to authorize the first operation. After the first operation is authorized, if the first timestamp conforms to the fourth rule, the first terminal authorizes the second operation; or if the first timestamp does not conform to the fourth rule, the first terminal refuses to authorize the second operation.

It should be noted that, in the foregoing security policies 6 to 8, if the first terminal refuses to authorize the first operation, the first terminal may directly refuse to authorize the second operation without subsequent determining.

For example, in an application scenario in which the digital key is used as a vehicle key, the first terminal is a vehicle, the second terminal is a mobile phone, the service instruction includes a first instruction and a second instruction, and the first instruction and the second instruction are sent to the mobile phone together. A service operation corresponding to the first instruction is a first operation "unlocking", and a service operation corresponding to the second instruction is a second operation "starting the engine". The foregoing security policy 8 is used. The interval duration is set to 24 hours in the fourth rule.

After receiving the first instruction and the second instruction, the mobile phone sends a service response message to the vehicle, where the service response message includes the user identity authentication result and the first timestamp. After the vehicle successfully verifies the service response message sent by the mobile phone, it may be first determined whether the user identity authentication result conforms to the sub-rule a in the first rule. If the user identity authentication result in the user identity authentication information is "succeed", the user identity authentication result conforms to the sub-rule a. Therefore, the vehicle authorizes the service operation "unlocking". In this case, the vehicle lock is unlocked, so that the user can enter the vehicle. Then, whether the first timestamp conforms to the fourth rule is determined. If the first timestamp is 20:00 on March 5 and the current time is 12:00 on March 6, interval duration between the two times is 16 hours, which is less than the duration threshold 24 hours. In this case, the fourth rule is conformed to. Therefore, the vehicle authorizes the service operation "starting the engine". In this case, the vehicle engine is started, and the user can drive the vehicle.

It should be noted that the first instruction and the second instruction may alternatively be sent to the mobile phone separately. For example, when Bluetooth is used as the communication technology, an authentication module in the vehicle sends different service instructions to the mobile phone at different phases. In this case, first, when the user approaches the vehicle, the user interacts, by using the mobile phone, with the communication module associated with the door. The vehicle sends a service instruction about unlocking, namely, the first instruction, to the mobile phone. After receiving the first instruction, the mobile phone sends a service response message to the vehicle, where the service response message includes the user identity authentication result. After the vehicle successfully verifies the service response message sent by the mobile phone, it may be determined whether the user identity authentication result conforms to the sub-rule a in the first rule. If the user identity authentication result in the user identity authentication information is "succeed", the user identity authentication result conforms to the sub-rule a. Therefore, the vehicle authorizes the service operation "unlocking". In this case, the vehicle lock is unlocked, so that the user can enter the vehicle. After detecting, by using a positioning technology (such as UWB positioning), that the user enters the vehicle, the vehicle sends a service instruction about starting the engine, namely, the second instruction, to the mobile phone. After receiving the second instruction, the mobile phone sends another service response message to the vehicle, where the service response message includes the user identity authentication result and the first timestamp. After the vehicle successfully verifies the service response message sent by the mobile phone and it is determined that the user identity authentication result conforms to the sub-rule a in the first rule, whether the first timestamp conforms to the fourth rule is further determined. Assuming that the first timestamp conforms to the fourth rule, the vehicle authorizes the service operation "starting the engine". In this case, the vehicle engine is started, and the user can drive the vehicle.

It can be learned that when a plurality of instructions are sent to the mobile phone separately, the mobile phone may send a plurality of service response messages, and the plurality of service response messages each may include same user identity authentication information. In addition, a process of determining whether the first rule is conformed to may be repeated once or more times.

(7) Security Policy 9

The security policy 9 includes a first rule and a fifth rule. The first rule is the same as that in the foregoing security policy 1, and the fifth rule is the same as that in the foregoing security policy 5. Details are not described herein again.

As described above, the service instruction may include a first instruction and a second instruction; and correspondingly, the service operation includes a first operation corresponding to the first instruction and a second operation corresponding to the second instruction. When the user identity authentication information satisfies different rules in the security policy, the first terminal authorizes different service operations.

When the security policy 9 is used, the first terminal needs to sequentially determine whether the user identity authentication result conforms to the sub-rule a in the first rule and whether the first timestamp conforms to the fifth rule. If the user identity authentication result conforms to the sub-rule a in the first rule, the first terminal authorizes the first operation; or if the user identity authentication result does not conform to the sub-rule a in the first rule, the first terminal refuses to authorize the first operation. After the first operation is authorized, if the first timestamp conforms to the fifth rule, the first terminal authorizes the second operation; or if the first timestamp does not conform to the fourth rule, the first terminal refuses to authorize the second operation. In addition, if the first timestamp does not conform to the fifth rule, the first terminal may alternatively freeze the digital key, indicate the second terminal to freeze the digital key, or indicate the user to perform identity authentication again, thereby improving security of using the digital key.

It should be noted that if the first terminal refuses to authorize the first operation, the first terminal may directly refuse to authorize the second operation without determining whether the first timestamp conforms to the fifth rule.

For example, in an application scenario in which the digital key is used as a vehicle key, the first terminal is a vehicle, the second terminal is a mobile phone, and the service instruction includes a first instruction and a second instruction. A service operation corresponding to the first instruction is a first operation "unlocking", and a service operation corresponding to the second instruction is a second operation "starting the engine". The foregoing security policy 9 is used.

After the vehicle successfully verifies the service response message sent by the mobile phone, it may be first determined whether the user identity authentication result conforms to the sub-rule a in the first rule. If the user identity authentication result in the user identity authentication information is "succeed", the user identity authentication result conforms to the sub-rule a. Therefore, the vehicle authorizes the service operation "unlocking". In this case, the vehicle lock is unlocked, so that the user can enter the vehicle. Then, the vehicle obtains the second timestamp, and determines whether the first timestamp and the second timestamp conform to the fifth rule. It is assumed that the first timestamp is 20:00 on March 5, and the second timestamp is 10:00 on March 5. In this case, the second timestamp is earlier than the first timestamp, and it indicates that the mobile phone is not powered on again after 20:00 on March 5. Therefore, the fifth rule is conformed to. Therefore, the vehicle authorizes the service operation "starting the engine". In this case, the vehicle engine is started, and the user can drive the vehicle.

(8) Security Policy 10

The security policy 10 includes a first rule, a fourth rule, and a fifth rule. The first rule is the same as that in the foregoing security policy 1, the fourth rule is the same as that in the foregoing security policy 4, and the fifth rule is the same as that in the foregoing security policy 5. Details are not described herein again.

As described above, the service instruction may include a first instruction and a second instruction; and correspondingly, the service operation includes a first operation corresponding to the first instruction and a second operation corresponding to the second instruction. When the user identity authentication information satisfies different rules in the security policy, the first terminal authorizes different service operations.

When the security policy 10 is used, the first terminal needs to determine whether the user identity authentication result conforms to the sub-rule a in the first rule and whether the first timestamp conforms to the fourth rule and the fifth rule. If the user identity authentication result conforms to the sub-rule a in the first rule, the first terminal authorizes the first operation; or if the user identity authentication result does not conform to the sub-rule a in the first rule, the first terminal refuses to authorize the first operation. After the first terminal authorizes the first operation, if the first timestamp conforms to the fourth rule, the first terminal authorizes the second operation; or if the first timestamp does not conform to the fourth rule, the first terminal determines whether the first timestamp conforms to the fifth rule. If the first timestamp conforms to the fifth rule, the first terminal authorizes the second operation; or if the first timestamp does not conform to the fourth rule, the first terminal refuses to authorize the second operation.

Similar to that in the security policy 5, if the first timestamp does not conform to the fifth rule, the first terminal may alternatively freeze the digital key, indicate the second terminal to freeze the digital key, or indicate the user to perform identity authentication again, thereby improving security of using the digital key. If the first terminal refuses to authorize the first operation, the first terminal may directly refuse to authorize the second operation without determining whether the first timestamp conforms to the fifth rule.

For example, in an application scenario in which the digital key is used as a vehicle key, the first terminal is a vehicle, the second terminal is a mobile phone, and the service instruction includes a first instruction and a second instruction. A service operation corresponding to the first instruction is a first operation "unlocking", and a service operation corresponding to the second instruction is a second operation "starting the engine". The foregoing security policy 10 is used.

After the vehicle successfully verifies the service response message sent by the mobile phone, it may be first determined whether the user identity authentication result conforms to the sub-rule a in the first rule. If the user identity authentication result in the user identity authentication information is "succeed", the user identity authentication result conforms to the sub-rule a. Therefore, the vehicle authorizes the service operation "unlocking". In this case, the vehicle lock is unlocked, so that the user can enter the vehicle. Then, whether the first timestamp conforms to the fourth rule is determined. If the first timestamp is 20:00 on March 5 and the current time is 12:00 on March 7, interval duration between the two times is 40 hours, which is greater than the duration threshold 24 hours. In this case, the fourth rule is not conformed to. In this case, the vehicle obtains the second timestamp, and determines whether the first timestamp and the second timestamp conform to the fifth rule. It is assumed that the second timestamp is 10:00 on March 5. In this case, the second timestamp is earlier than the first timestamp, and it indicates that the mobile phone is not powered on again after 20:00 on March 5. Therefore, the fifth rule is conformed to. In this case, the vehicle authorizes the service operation "starting the engine". In this case, the vehicle engine is started, and the user can drive the vehicle.

(9) Security Policy 11

The security policy 11 also includes a first rule, a fourth rule, and a fifth rule. The first rule is the same as that in the foregoing security policy 1, the fourth rule is the same as that in the foregoing security policy 4, and the fifth rule is the same as that in the foregoing security policy 8. Details are not described herein again.

As described above, the service instruction may include a first instruction and a second instruction; and correspondingly, the service operation includes a first operation corresponding to the first instruction and a second operation corresponding to the second instruction. When the user identity authentication information satisfies different rules in the security policy, the first terminal authorizes different service operations.

When the security policy 11 is used, the first terminal needs to determine whether the user identity authentication result conforms to the sub-rule a in the first rule and whether the first timestamp conforms to the fourth rule and the fifth rule. If the user identity authentication result conforms to the sub-rule a in the first rule and the first timestamp conforms to the fourth rule, the first terminal authorizes the first operation; or if the user identity authentication result does not conform to the sub-rule a in the first rule or the first timestamp does not conform to the fourth rule, the first terminal refuses to authorize the first operation. After the first terminal authorizes the first operation, if the first timestamp conforms to the fifth rule, the first terminal authorizes the second operation; or if the first timestamp does not conform to the fourth rule, the first terminal refuses to authorize the second operation.

Similar to that in the security policy 5, if the first timestamp does not conform to the fifth rule, the first terminal may alternatively freeze the digital key, indicate the second terminal to freeze the digital key, or indicate the user to perform identity authentication again, thereby improving security of using the digital key. If the first terminal refuses to authorize the first operation, the first terminal may directly refuse to authorize the second operation without determining whether the first timestamp conforms to the fifth rule.

For example, in an application scenario in which the digital key is used as a vehicle key, the first terminal is a vehicle, the second terminal is a mobile phone, and the service instruction includes a first instruction and a second instruction. A service operation corresponding to the first instruction is a first operation "unlocking", and a service operation corresponding to the second instruction is a second operation "starting the engine". The foregoing security policy 11 is used.

After the vehicle successfully verifies a service response message sent by the mobile phone, whether the user identity authentication result conforms to the sub-rule a in the first rule is determined first, and whether the first timestamp conforms to the fourth rule is determined. If the user identity authentication result in the user identity authentication information is "succeed", the user identity authentication result conforms to the sub-rule a. If the first timestamp is 20:00 on March 5 and the current time is 12:00 on March 6, interval duration between the two times is 16 hours, which is less than the duration threshold 24 hours. In this case, the fourth rule is conformed to. Therefore, the vehicle authorizes the service operation "unlocking". In this case, the vehicle lock is unlocked, so that the user can enter the vehicle. Then, the vehicle obtains the second timestamp, and determines whether the first timestamp and the second timestamp conform to the fifth rule. It is assumed that the second timestamp is 10:00 on March 5. In this case, the second timestamp is earlier than the first timestamp, and it indicates that the mobile phone is not powered on again after 20:00 on March 5. Therefore, the fifth rule is conformed to. Therefore, the vehicle authorizes the service operation "starting the engine". In this case, the vehicle engine is started, and the user can drive the vehicle.

(10) Security Policy 12

In some application scenarios, even if the user identity authentication result does not conform to the first rule a, some service operations may be authorized and some other service operations are refused to be authorized. Then, another round of service instructions of the digital key are initiated again. After a new round of service response messages of the digital key are received, whether to authorize some other service operations is determined.

Based on this, this application further provides a security policy 12. The security policy 12 includes any one or more of a first rule, a second rule, a third rule, a fourth rule, and a fifth rule. The first rule is the same as that in the foregoing security policy 1, the second rule is the same as that in the foregoing security policy 2, the third rule is the same as that in the foregoing security policy 3, the fourth rule is the same as that in the foregoing security policy 4, and the fifth rule is the same as that in the foregoing security policy 5. Details are not described herein again.

As described above, the service instruction may include a first instruction and a second instruction; and correspondingly, the service operation includes a first operation corresponding to the first instruction and a second operation corresponding to the second instruction. When the user identity authentication information satisfies different rules in the security policy, the first terminal authorizes different service operations.

When the security policy 12 is used, the first terminal needs to determine whether the user identity authentication result conforms to a sub-rule b in the first rule. If the user identity authentication result conforms to the sub-rule b in the first rule, the first terminal authorizes the first operation corresponding to the first instruction, and the first terminal may directly refuse to authorize the second operation corresponding to the second instruction and does not need to determine whether another rule is conformed to.

After that, the method for authenticating an identity of a digital key may further include the following step: The first terminal sends a new service instruction to the second terminal, where the new service instruction includes a second instruction.

It should be noted that when sending a new service instruction to the second terminal, the first terminal may cyclically send the new service instruction once or more times. This is not limited in this application.

For example, in an application scenario in which the digital key is used as a vehicle key, the first terminal is a vehicle, the second terminal is a mobile phone, and the mobile phone is currently in a power-off state. The service instruction includes a first instruction and a second instruction. A service operation corresponding to the first instruction is a first operation "unlocking", and a service operation corresponding to the second instruction is a second operation "starting the engine". The foregoing security policy 12 is used.

After the vehicle successfully verifies the service response message sent by the mobile phone, it may be first determined whether the user identity authentication result conforms to the sub-rule b in the first rule. If the user identity authentication result in the user identity authentication information is "not completed", the user identity authentication result conforms to the sub-rule b. Therefore, the vehicle authorizes the service operation "unlocking", and refuses to authorize the service operation "starting the engine". Actually, whether to authorize the service operation "unlocking" herein does not depend on the user identity authentication result. Regardless of whether the user identity authentication result is "succeed", "fail", or "not completed", the service operation "unlocking" may be authorized. However, when the user identity authentication result is "fail" or "not completed", the service operation "starting the engine" may be directly refused to be authorized, and the security policy corresponding to the service operation "starting the engine" does not need to be considered. Then, the vehicle sends a new service instruction to the mobile phone, where the new service instruction no longer includes an instruction related to "unlocking", namely, the first instruction, but includes only an instruction related to "starting the engine", namely, the second instruction. Because the vehicle lock is unlocked, the user may enter the vehicle to charge the mobile phone. After the user powers on the mobile phone again and enters a normal battery mode, the user may complete user identity authentication in a power-on state. The vehicle sends a new service instruction to the mobile phone once. After a service response message that satisfies a preset security policy for authorizing the second operation is obtained and the vehicle authorizes the service operation "starting the engine", the vehicle engine is started, and the user may drive the vehicle.

It should be understood that the foregoing security policies 1 to 12 are only several examples applicable to the method for authenticating an identity of a digital key in this application. A person skilled in the art may further combine the foregoing five rules based on different application scenarios, or combine the five rules with another rule to form another other security policy. Several security policies may even be combined provided that the several security policies do not conflict with each other.

It should be understood that, in the foregoing security policies, a case in which the service instruction includes a plurality of instructions is described, for ease of understanding, by using a case in which the service instruction includes only the first instruction and the second instruction. In actual application, the service instruction may further include more instructions. Whether to authorize a service operation corresponding to one of the service instructions may be determined by one or more rules.

It should be further understood that, in this application, when the second terminal in the non-preset operating state receives a service instruction sent by the first terminal, the second terminal may generate a service response message in response to the service instruction. In this case, the service response message may also include the foregoing content such as the user identity authentication result and the first timestamp. In this case, the user identity authentication result may be generated by the second terminal by performing identity authentication on the user in real time, or may be previously stored in the secure element. After receiving the service response message, the first terminal may verify the service response message by using the first key, and further determine a risk by using the foregoing possible security policies such as the security policy 1 and the security policy 4, thereby improving security of using the digital key.

Optionally, in the foregoing identity authentication method, the second terminal may further perform the following step:

S107: After the second terminal switches from the preset operating state to the non-preset operating state, the second terminal performs invalidation processing on the user identity authentication information.

Alternatively, the second terminal may further perform the following step:

S108: Before the user identity authentication information is stored in the secure element, the second terminal performs invalidation processing on the user identity authentication information originally stored in the secure element.

The second terminal is required to perform identity authentication once each time the second terminal enters the preset operating state from the non-preset operating state. Therefore, each time the user uses the digital key, one piece of user identity authentication information is stored in the secure element regardless of the identity authentication result. To prevent the original user identity authentication information from interfering with the newest user identity authentication information subsequently written to the secure element, when the second terminal switches from the preset operating state to the non-preset operating state next time, the second terminal performs invalidation processing on the user identity authentication information stored in the secure element. Alternatively, in a next process in which the second terminal switches from the non-preset operating state to the preset operating state, before the second terminal stores the newest user identity authentication information in the secure element, the second terminal performs invalidation processing on the original user identity authentication information stored in the secure element.

In an implementation of performing invalidation processing, the user identity authentication information stored in the digital key applet or the broker applet in the secure element may be deleted. In another implementation of performing invalidation processing, the user identity authentication information previously stored in the secure element may be marked as invalid. By performing invalidation processing, it can be ensured that the secure element stores one piece of newest valid user identity authentication information each time after the second terminal switches from the non-preset operating state to the preset operating state.

In addition, the server may also perform invalidation processing on the original user identity authentication information. The server may further send notification information to the first terminal, for example, "the mobile phone has been back online" or "the user identity authentication information has become invalid", to notify the user that the original user identity authentication information has become invalid.

Figure 8:
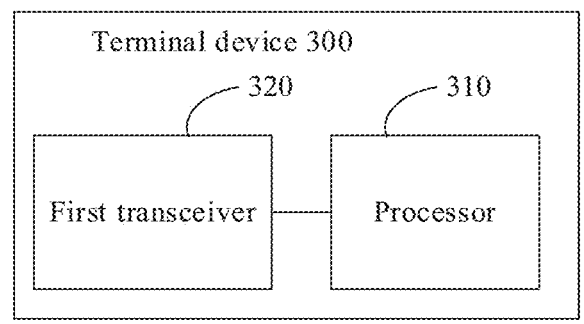
FIG. 8 is a schematic diagram of a structure of an implementation of a terminal device according to this application.

In a second embodiment of this application, a terminal device is provided. The terminal device may be applied to a plurality of different scenarios, for example, may be applied to a vehicle, a POS terminal, a traffic card swipe machine, and an access control system. FIG. 8 is a schematic diagram of a structure of an implementation of the terminal device. The terminal device 300 includes a first transceiver 320 and one or more processors 310.

The first transceiver 320 is configured to: send a service instruction to a second terminal, and receive a service response message sent by the second terminal. In actual application, the first transceiver 320 may be an NFC communication module; or may be a Bluetooth module, a UWB module, or the like.

The processor 310 is configured to: obtain user identity authentication information after verification performed on the service response message by using a first key succeeds, and verify the user identity authentication information, where the first key is a key pre-agreed on by the second terminal and the terminal device 300, the user identity authentication information is stored in a secure element of the second terminal, the user identity authentication information includes a user identity authentication result, the user identity authentication result is generated by an identity authentication system of the second terminal before the second terminal enters a preset operating state, and the preset operating state is a state in which the identity authentication system of the second terminal cannot generate an identity authentication result.

In actual application, the processor 310 may connect all parts of the entire terminal device 300 by using various interfaces and lines. The processor 310 may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL for short), or any combination thereof.

In actual application, the terminal device 300 may further include a memory. The memory stores one or more computer programs, and the one or more computer programs include instructions. When the instructions are executed by the one or more processors 310, the terminal device 300 is enabled to implement some or all steps of any method performed by the first terminal in the first embodiment. The memory may include a volatile memory (volatile memory), for example, a random access memory (random access memory, RAM), and may further include a non-volatile memory (non-volatile memory), for example, a flash memory (flash memory), a hard disk drive (hard disk drive, HDD), or a solid-state drive (solid-state drive, SSD). The memory may further include a combination of the foregoing types of memories.

Figure 9:
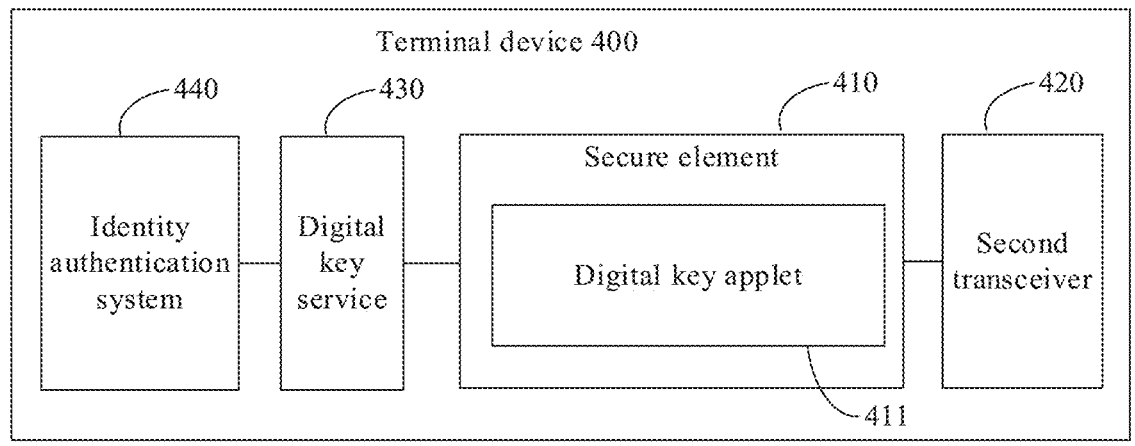
FIG. 9 is a schematic diagram of a structure of an implementation of another terminal device according to this application.

An embodiment further provides another terminal device. The terminal device may be applied to a plurality of different scenarios, for example, may be applied to a mobile phone, a tablet computer, and an intelligent wearable device. FIG. 9 is a schematic diagram of a structure of an implementation of the terminal device. The terminal device 400 includes a secure element 410, a second transceiver 420, and an identity authentication system 440.

The second transceiver 420 is configured to receive a service instruction from a first terminal; and in a preset operating state, send, to the first terminal in response to the service instruction, a service response message processed by using a first key. The service response message includes user identity authentication information, the user identity authentication information includes a user identity authentication result, and the first key is a key pre-agreed on by the terminal device 400 and the first terminal. In actual application, the second transceiver 420 may be an NFC communication module; or may be a Bluetooth module, a UWB module, or the like. The second transceiver 420 can be powered on independently. Regardless of whether a main chip of the terminal device is in a normal battery mode or a power-off or low battery mode, the second transceiver 420 can be powered on and work independently.

The secure element 410 is configured to store the user identity authentication information and the first key. In actual application, the secure element may be an embedded secure element (embedded SE, eSE), an inSE secure module integrated into a main chip (System on Chip, SoC) of a mobile phone, a universal integrated circuit card secure element (Universal Integrated Circuit Card Secure Element, UICC SE), or the like. The secure element 410 stores a digital key applet 411, and the foregoing first key is stored in the digital key applet 411.

The user identity authentication system 440 is configured to generate the user identity authentication result before the terminal device 400 enters the preset operating state, where the preset operating state is a state in which the identity authentication system of the terminal device cannot generate an identity authentication result. It should be noted that when the terminal device 400 is in a normal battery mode, the user identity authentication system 440 may also perform identity authentication on a user by collecting a password, a biometric feature, or the like of the user.

Optionally, the terminal device 400 may further include a digital key service 430. The digital key service 430 may be separately connected to the identity authentication system 440 and the secure element 410. As described in the first embodiment, the digital key service provides a digital key management function for the terminal device 400. Through a management interface provided by the digital key service 430, the user can view one or more digital keys stored in the digital key applet 411 and perform mandatory identity authentication configuration on these digital keys. The digital key service 430 can add an identity authentication operation to the state switching procedure of the terminal device 400 when the user has been configured with at least one digital key with mandatory identity authentication (for example, the first key). The digital key service 430 may trigger the identity authentication procedure in the terminal device 400, and generate a user identity authentication result by using the identity authentication system 440. Optionally, the digital key service 430 may further generate a user interface to notify the user of a purpose of the currently performed identity authentication. Optionally, the digital key service 430 may obtain the user identity authentication result and a first timestamp, and then store the user identity authentication result and the first timestamp in the secure element 410 together as the user identity authentication information.

In addition, an embodiment further provides a computer readable storage medium. The storage medium includes instructions. When the instructions are run on a computer, the computer is enabled to perform any method performed by the first terminal in the first embodiment.

An embodiment further provides another computer readable storage medium, including instructions. When the instructions are run on a computer, the computer is enabled to perform any method performed by the second terminal in the first embodiment.

The readable storage medium herein may be a magnetic disk, an optical disc, a DVD, a USB, a read-only memory (ROM), a random access memory (RAM), or the like. A specific storage medium form is not limited in this application.

In addition, an embodiment of this application further provides a computer program product including instructions. When the computer program product runs on a computer, the computer is enabled to perform steps of any method performed by the first terminal in the first embodiment, or perform steps of any method performed by the second terminal in the first embodiment.

Some or all the foregoing embodiments may be implemented by software, hardware, firmware, or any combination thereof. When implemented by software, some or all the foregoing embodiments may be implemented in a form of a computer program product. The computer program product includes one or more computer instructions. When the computer program instructions are loaded and executed on a computer, some or all the procedures or functions described in this application are generated. The computer may be a general-purpose computer, a special-purpose computer, a computer network, or another programmable apparatus. The computer instructions may be stored in a computer readable storage medium or transmitted from one computer readable storage medium to another computer readable storage. For example, the computer instructions may be transmitted from one website site, computer, server, or data center to another website site, computer, server, or data center in a wired (for example, coaxial cable, optical fiber, or digital subscriber line (DSL)) manner or a wireless (for example, infrared, wireless, or microwave) manner. The computer readable storage medium may be any usable medium that can be accessed by a computer, or a data storage device such as a server or a data center that integrates one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

The terminal device and the computer readable storage medium in this embodiment are used to perform some or all steps of any method for authenticating an identity of a digital key in the first embodiment, and correspondingly, have beneficial effects of the foregoing method. Details are not described herein again.

It should be understood that, in various embodiments of this application, an execution sequence of each step should be determined based on a function and internal logic of the step. A sequence number of each step does not mean an execution sequence, and does not constitute a limitation on an implementation process of the embodiments.

Unless otherwise stated, "a plurality of" in this specification means two or more. In the embodiments of this application, words such as "first" and "second" are used to distinguish between same items or similar items having basically same functions and effects. A person skilled in the art may understand that words such as "first" and "second" do not constitute a limitation on a quantity or an execution sequence, and words such as "first" and "second" do not indicate a necessary difference either.

It should be understood that same and similar parts between the embodiments in this specification may be mutually referred to. Particularly, because the embodiments of the terminal device and the computer readable storage medium are basically similar to the method embodiment, the descriptions are relatively simple. For a related part, refer to the description in the method embodiment. The foregoing implementations of the present invention are not intended to limit the protection scope of the present invention.

What is claimed is:

1. A method implemented by a first terminal, wherein the method comprises:
    sending a service instruction to a second terminal;
    receiving a service response message from the second terminal;
    performing verification on the service response message using a first key pre-agreed-to by the second terminal and the first terminal;
    obtaining, in response to successfully verifying the service response message, user identity authentication information stored in a secure element of the second terminal;
    verifying, based on matching the user identity authentication with a preset authentication result, the user identity authentication information, wherein the user identity authentication information comprises a first timestamp indicating a first time of matching the user identity authentication result; and
    authorizing, in response to verifying the user identification authentication information, a service operation corresponding to the service instruction when the second terminal remains in a preset operating state after the first time.

2. The method of claim 1, further comprising:
    authorizing a first service operation corresponding to the service instruction when a total quantity of times for which the second terminal in the preset operating state authorizes a second service operation is within a preset quantity threshold; and
    authorizing the first service operation when a frequency that the second terminal in the preset operating state authorizes a third service operation is within a preset frequency threshold.

3. The method of claim 1, wherein the method further comprises authorizing a service operation corresponding to the service instruction when a duration between a current time and the first timestamp is within a preset duration threshold.

4. The method of claim 3, further comprising:
    when the second terminal switches from the preset operating state to a non-preset operating state:
        freezing a digital key; or
        instructing the second terminal to freeze the digital key; or
        instructing a user to perform identity authentication.

5. The method of claim 1, wherein the service instruction comprises a first instruction and a second instruction, wherein a first operation corresponds to the first instruction and a second operation corresponds to the second instruction, and wherein the method further comprises:
    authorizing the first operation; and
    authorizing the second operation after authorizing the first operation when a total quantity of times for which the second terminal in the preset operating state authorizes a third service operation is within a preset quantity threshold, a frequency that the second terminal in the preset operating state authorizes a fourth service operation is within a preset frequency threshold, a duration between a current time and the first timestamp is within a preset duration threshold, or the second terminal remains in the preset operating state after the first time.

6. The method of claim 1, wherein the service instruction comprises a first instruction and a second instruction, wherein a first operation corresponds to the first instruction and a second operation corresponds to the second instruction, and wherein the method further comprises:
    authorizing the first operation when the user identity authentication result matches a preset authentication result; and
    authorizing the second operation when the second terminal remains in the preset operating state when a duration between a current time and the first time is beyond a preset duration threshold.

7. The method of claim 1, wherein the service instruction comprises a first instruction and a second instruction, wherein a first operation corresponds to the first instruction and a second operation corresponds to the second instruction, and wherein the method further comprises:

authorizing the first operation when a duration between a current time and the first timestamp is within a preset duration threshold; and authorizing the second operation after authorizing the first operation and when the second terminal remains in the preset operating state after the first time.

8. The method of claim 1, further comprising:
receiving a second timestamp indicating a second time within a time period in which the second terminal switches from the preset operating state to the non-preset operating state and closest to a third time that the second terminal sends the service response message;
determining that the second terminal remains in the preset operating state after the first time when the second timestamp is earlier than the first timestamp; and
determining that the second terminal switches from the preset operating state to the non-preset operating state after the first time when the second timestamp is later than the first timestamp.

9. The method of claim 1, further comprising:
sending the first timestamp;
obtaining, in response to sending the first timestamp, an online verification result based on whether the second terminal switches from the preset operating state to the non-preset operating state after the first time;
determining that the second terminal remains in the preset operating state after the first time when the online verification result is a success; and
determining that the second terminal has switched from the preset operating state to the non-preset operating state after the first time when the online verification result is a failure.

10. The method of claim 1, wherein the service instruction comprises a first instruction and a second instruction, wherein a first operation corresponds to the first instruction and a second operation corresponds to the second instruction, and wherein the method further comprises:
when the user identity authentication result does not match a preset authentication result:
authorizing the first operation;
refusing to authorize the second operation; and
sending, to the second terminal, a new service instruction comprising a third instruction.

11. The method of claim 1, wherein the service response message further comprises verification data generated by processing the user identity authentication information using a second key, wherein the second key is pre-agreed by the second terminal and the first terminal, wherein the second key is different from the first key, and wherein the method further comprises
authorizing a service operation corresponding to the service instruction when, based on the second key and the verification data, the user identity authentication information is valid and the user identity authentication information conforms to a preset security policy.

12. A method implemented by a second terminal, wherein the method comprises:
generating, by an identity authentication system of the second terminal and before the second terminal enters a preset operating state, a user identity authentication result;
receiving a service instruction from a first terminal;
processing, using a first key pre-agreed-to by the second terminal and the first terminal, a service response message comprising user identity authentication information stored in a secure element of the second terminal, wherein the user identity authentication information comprises a user identity authentication result and a first timestamp indicating a first time of generating the user identity authentication result; and
sending, to the first terminal in response to the service instruction and while in the preset operating state, the service response message when the user identity authentication result matches a preset authentication result.

13. The method of claim 12, wherein processing the service response message further comprises generating verification data by processing the user identity authentication information using a second key, wherein the second key is pre-agreed to by the second terminal and the first terminal, and wherein the second key is different from the first key.

14. The method of claim 12, wherein before receiving the service instruction, the method further comprises:
making a determination that a digital key configured with a mandatory identity authentication exists before the second terminal enters the preset operating state, wherein the digital key requires the second terminal to perform user identity authentication before the second terminal enters the preset operating state;
generating, in response to the determination, the user identity authentication result; and
storing, in the secure element, the user identity authentication information comprising the user identity authentication result.

15. A first terminal comprising:
a memory configured to store one or more computer programs; and
one or more processors coupled to the memory and configured to execute the one or more computer programs to cause the first terminal to:
send a service instruction to a second terminal;
receive a service response message from the second terminal;
perform verification on the service response message using a first key that is pre-agreed by the second terminal and the first terminal;
obtain in response to verifying the service response message, user identity authentication information;
verify, based on matching the user identity authentication with a preset authentication result, the user identity authentication information, wherein the user identity authentication information comprises a first timestamp indicating a first time of matching the user identity authentication result; and
authorize, in response to verifying the user identification authentication information, a service operation corresponding to the service instruction when the second terminal remains in a preset operating state after the first time.

16. The first terminal of claim 15, wherein the processor is further configured to execute the one or more computer programs to cause the first terminal to authorize a first service operation corresponding to the service instruction:
when a total quantity of times for which the second terminal in the preset operating state authorizes a second service operation is within a preset quantity threshold;
when a frequency that the second terminal in the preset operating state authorizes a third service operation is within a preset frequency threshold; or
when a duration between a current time and a first timestamp indicating a time of generating the user identity authentication result is within a preset duration threshold.

17. The method of claim 12 further comprising sending to the first terminal an indication of a total quantity of times the second terminal in the preset operating state has authorized a second service operation.

18. The method of claim 12 further comprising sending to the first terminal an indication of a frequency that the second terminal in the preset operating state has authorized a third service operation.

19. The method of claim 12 further comprising sending to the first terminal an indication of the second terminal operating state.

20. The method of claim 12, wherein the service response message comprises verification data generated by processing the user identity authentication information using a second key, wherein the second key is pre-agreed by the second terminal and the first terminal, and wherein the second key is different from the first key.

* * * * *